(12) United States Patent
Okuno et al.

(10) Patent No.: US 9,008,437 B2
(45) Date of Patent: Apr. 14, 2015

(54) INFORMATION PROCESSING APPARATUS, INFORMATION PROCESSING METHOD AND STORAGE MEDIUM

(71) Applicant: Canon Kabushiki Kaisha, Tokyo (JP)

(72) Inventors: Yasuhiro Okuno, Tokyo (JP); Katsuhiko Mori, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 163 days.

(21) Appl. No.: 13/684,894

(22) Filed: Nov. 26, 2012

(65) Prior Publication Data

US 2013/0142434 A1 Jun. 6, 2013

(30) Foreign Application Priority Data

Dec. 1, 2011 (JP) ................. 2011-264118

(51) Int. Cl.
*G06K 9/46* (2006.01)
*G06K 9/62* (2006.01)

(52) U.S. Cl.
CPC ............. *G06K 9/6267* (2013.01); *G06K 9/46* (2013.01); *G06K 9/6202* (2013.01); *G06K 9/6282* (2013.01)

(58) Field of Classification Search
CPC ............ G06K 9/4671; G06K 9/00456; G06K 9/6267; G06K 9/00744; G06K 9/00288; G06K 9/46; G06K 9/6255; G06K 2209/40; G06K 9/4628; H01J 2237/30466; G06F 17/30247; G06F 3/014; G06T 7/0042; G06T 19/00; A61B 6/5217; B29C 67/0088; G05B 2219/37205; G11B 27/036; H04N 13/0468
USPC .......... 382/195, 155, 186, 190, 199; 345/420, 345/629, 632, 633
See application file for complete search history.

(56) References Cited

U.S. PATENT DOCUMENTS 5,930,391 A * 7/1999 Kinjo ............................ 382/173
6,233,353 B1 * 5/2001 Danisewicz ................. 382/176
(Continued)

FOREIGN PATENT DOCUMENTS

JP 6-229771 A 8/1994
JP 7-129898 A 5/1995

OTHER PUBLICATIONS

Mustafa Ozuysal et al., "Fast Keypoint Recognition in Ten Lines of Code," Computer Vision Laboratory, IEEE Conference on Computer Vision and Pattern Recognition, 2007 pp. 1-8.

*Primary Examiner* — Vu Le
*Assistant Examiner* — Aklilu Woldemariam
(74) *Attorney, Agent, or Firm* — Fitzpatrick, Cella, Harper & Scinto

(57) ABSTRACT

An information processing apparatus sets a plurality of reference locations of data in information as one reference location pattern and acquires a feature amount obtained from a value of data of one of the plurality of pieces of reference information in one reference location pattern for each of a plurality of reference location patterns and the plurality of pieces of reference information. The apparatus extracts data included in the input information according to each of the plurality of reference location patterns, selects the reference location pattern for classification of the input information from the plurality of reference location patterns based on a value of data included in the extracted input information, and executes classification of the input information by using the feature amount in the selected reference location pattern and data included in the input information at a reference location indicated by the reference location pattern.

17 Claims, 17 Drawing Sheets

(56) References Cited

U.S. PATENT DOCUMENTS

| | | |
|---|---|---|
| 6,438,566 B1 | 8/2002 | Okuno et al. |
| 6,879,323 B1 * | 4/2005 | Takezawa et al. ............ 345/420 |
| 6,914,599 B1 * | 7/2005 | Rowe et al. ................... 345/420 |
| 7,007,002 B2 | 2/2006 | Matsugu et al. |
| 7,298,903 B2 * | 11/2007 | Wang et al. ................... 382/186 |
| 7,653,246 B2 * | 1/2010 | Hibi et al. .................... 382/195 |
| 7,952,594 B2 | 5/2011 | Morita et al. |
| 8,254,669 B2 * | 8/2012 | Nishida ......................... 382/155 |
| 8,320,683 B2 * | 11/2012 | Konishi ......................... 382/224 |
| 2004/0212848 A1 * | 10/2004 | Lapstun et al. ................ 358/474 |
| 2008/0069450 A1 * | 3/2008 | Minami et al. ................ 382/199 |
| 2008/0212115 A1 * | 9/2008 | Konishi ......................... 358/1.9 |
| 2012/0002880 A1 * | 1/2012 | Lipson et al. ................. 382/195 |

\* cited by examiner

FIG. 5

| | x1 | y1 | x2 | y2 | 131 |
|---|---|---|---|---|---|
| | x1(1) | y1(1) | x2(1) | y2(1) | |
| | x1(2) | y1(2) | x2(2) | y2(2) | |
| Nb BITS | x1(3) | y1(3) | x2(3) | y2(3) | |
| | x1(4) | y1(4) | x2(4) | y2(4) | |
| | .... | .... | .... | .... | |
| | x1(Nb) | y1(Nb) | x2(Nb) | y2(Nb) | |

FIG. 6

| BINARY CODE (401) | REFERENCE INFORMATION IDENTIFIER (402) |
|---|---|
| 00010101 | 000001 |
| 10010110 | 000002 |
| ~ | ~ |
| 11000110 | Nid-1 |
| 11110010 | Nid |

133

Nb TYPES

Nid BITS

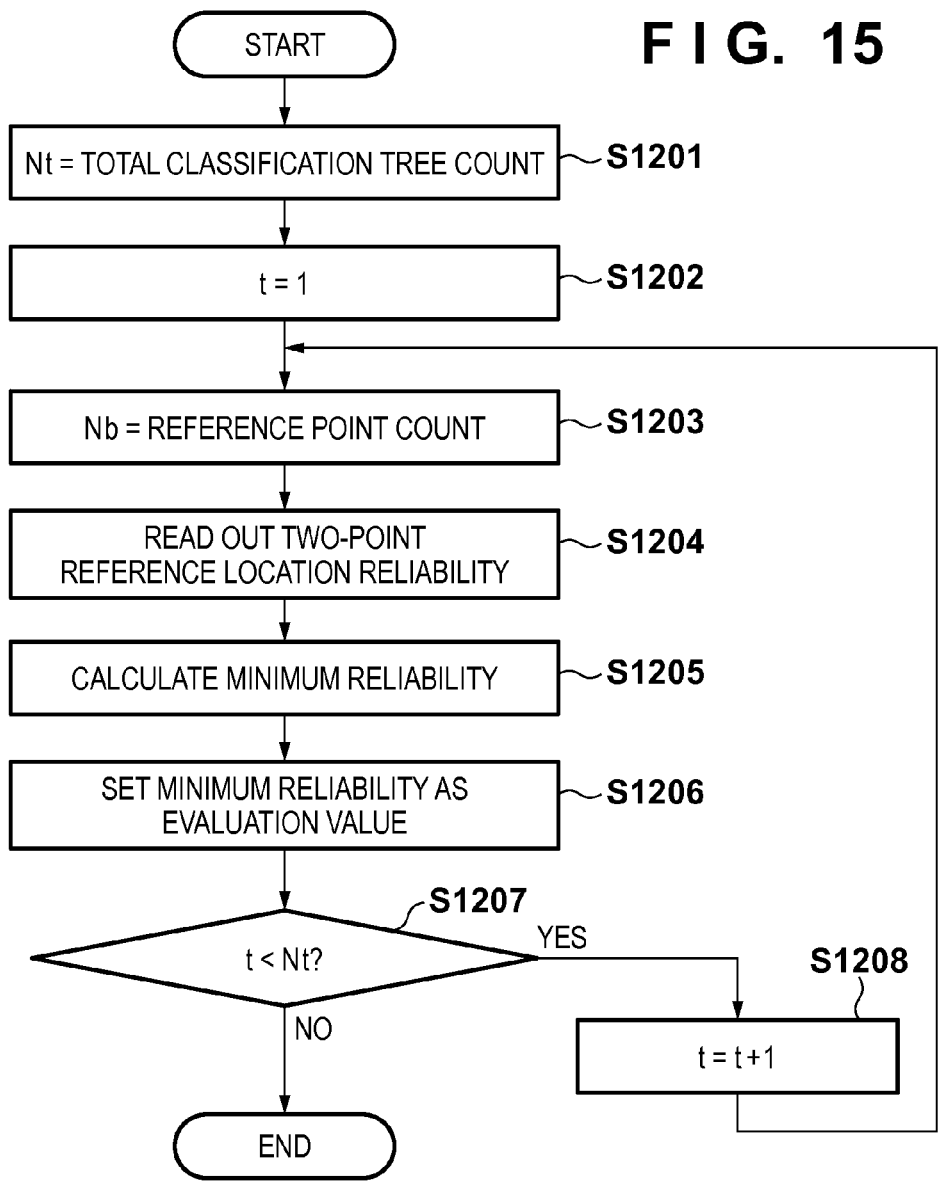

FIG. 16

| DATA IDENTIFICATION | x1 | y1 | x2 | y2 |
|---|---|---|---|---|
| d(1) | x1(1) | y1(1) | x2(1) | y2(1) |
| d(2) | x1(2) | y1(2) | x2(2) | y2(2) |
| d(3) | x1(3) | y1(3) | x2(3) | y2(3) |
| d(4) | x1(4) | y1(4) | x2(4) | y2(4) |
| .... | .... | .... | .... | .... |
| d(Nb) | x1(Nb) | y1(Nb) | x2(Nb) | y2(Nb) |

Nb BITS

~131

F I G. 19
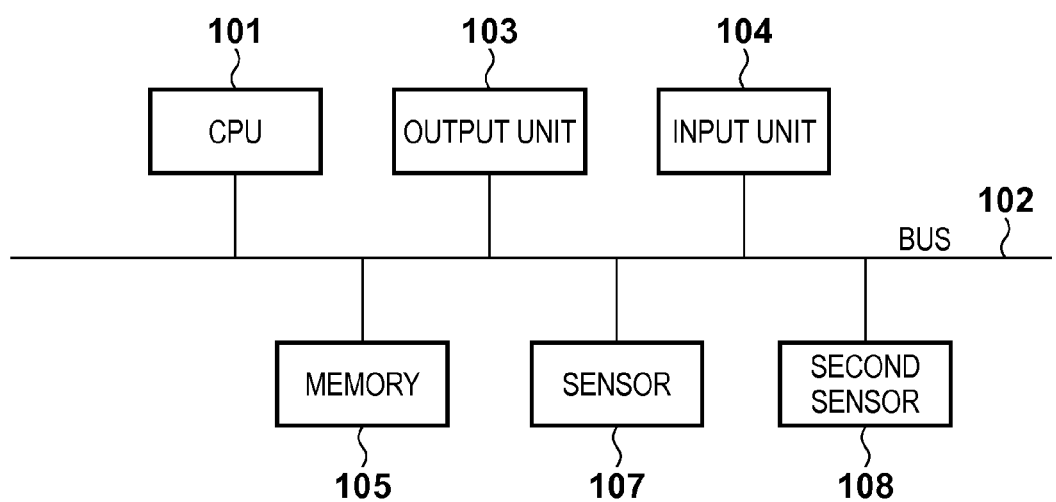

INFORMATION PROCESSING APPARATUS, INFORMATION PROCESSING METHOD AND STORAGE MEDIUM

BACKGROUND OF THE INVENTION

1. Field of the Invention

The present invention relates to an information processing apparatus which executes classification of information by using reference information, an information processing method, and a storage medium.

2. Description of the Related Art

Conventionally, there has been proposed a technique of classifying and identifying information by using an ensemble of classification trees. This technique generates L (L is a constant equal to or more than two) classification trees, and obtains higher identification performance by using all of them.

Mustafa Ozuysal, Pascal Fua, and Vincent Lepetit, "Fast keypoint recognition in ten lines of code," cvpr, pp. 1-8, 2007 IEEE Conference on Computer Vision and Pattern Recognition, 2007 (hereinafter referred to as "Mustafa") discloses a technique capable of identifying a plurality of types of images by applying a technique using an ensemble of classification trees to computer vision. The technique disclosed by Mustafa randomly generates N pieces of two-point location information each representing a pair of two reference locations for reference to two portions on an image. These two reference points will be referred to as a reference point pair hereinafter, and a set of N reference point pairs will be referred to as a reference point pair string hereinafter. This technique compares the magnitudes of image luminance values at the respective locations of the points of a reference point pair string with respect to a reference image and expressing a string of comparison results by a bit string of 0 and 1, thereby generating an N-bit binary code from one image and one reference point pair string. The technique generates N-bit binary codes in correspondence with a plurality of reference images as identification references, as described above, and records the relationship between the binary codes and the types of reference images. This operation is equivalent to the learning of one classification tree. The technique executes learning based on the above processing for L reference point pair strings respectively having different reference point pairs. That is, the technique learns the L classification trees.

When identifying an image, this technique uses all the L classification trees for the input image. That is, the technique calculates an N-bit binary code from the input image in accordance with the locations of the N reference point pairs determined at the time of learning of each classification tree. The technique executes this operation for the L reference point pair strings to obtain L binary codes. The technique then determines the type of reference image with the highest likelihood as the final identification result by using the obtained L binary codes and the L classification trees obtained by pre-learning.

According to Mustafa, upon generating many variations of reference images and obtaining a given binary code concerning an input image, this technique learns in advance the probability indicating to which type of reference image the input image corresponds. The technique then obtains the probability corresponding to each type of reference image concerning each of L binary codes acquired from the input image, and sets, as the final identification result, the type of reference image exhibiting the maximum product of probabilities obtained from L classification trees.

The method disclosed by Mustafa uses, as a weak classifier, a classification tree for classification based on a simple feature amount, that is, a comparison between pixel values at two reference points, and obtains the final identification result by an ensemble of many weak classifiers. This method performs image identification by converting an input image into a binary code by comparing pixel values at reference point pairs of the image and referring to a dictionary table based on the binary code in processing at the time of identification. This eliminates the necessity to entirely scan a tree structure at the time of identification as in the case of a classical classification tree, and hence can execute identification processing at higher speed than processing based on a classical classification tree. In addition, the literature has reported that the identification accuracy of this method is sufficiently high.

It is assumed that an image to be identified is not identical to a reference image used for learning, and is an image obtained by adding noise and deformation to the reference image. An identifier is expected to be able to identify an input image as an image kin to one of such reference images even if the input image differs from the reference images. In consideration of this, when using the method disclosed by Mustafa, the larger the luminance differences on an image at the locations of reference point pairs, the better, for the following reason. Assume that a given classification tree is applied to a given image. In this case, as the luminance value difference at reference point pair locations set on a classification tree decreases, the result of magnitude comparison between luminance values tends to be reversed due to noise. This increases the probability of a larger error in the image identification result obtained by using this classification tree.

However, the locations of two points where the luminance difference is large vary depending on each reference image, proper reference point locations generally vary depending on each reference image. On the other hand, according to the prior art, the locations of reference point pairs are set for each classification tree, and the locations of the reference point pair are commonly used to classify all images. It is therefore impossible to perform learning while changing reference point pair locations for each reference image.

In order to avoid such an inconvenience, it is conceivable to select reference point pairs that exhibit luminance value differences that are as large as possible with respect to all reference images. It is sufficiently possible that proper reference point pair locations differ among images. When there are many types of images to be identified, in particular, it is highly possible that there are no reference point pairs which exhibit luminance value differences equal to or larger than a predetermined value with respect to all images.

It is therefore difficult to set proper reference point pair locations common to all images at the time of learning. As a consequence, even if reference point pairs set to obtain a given classification tree are at locations suitable for the classification of several types of images, the locations are not suitable for the classification of other several types of images. In addition, according to the prior art, when a given type of image is input, using a classification tree based on reference point pairs unsuitable for the classification of the type of image will degrade the identification performance.

In consideration of the above problems, the present invention provides an information processing apparatus which selects a reference location pattern suitable for the classification of input information from a plurality of reference location patterns, an information processing method, and a program.

SUMMARY OF THE INVENTION

According to one aspect of the present invention, there is provided an information processing apparatus which classify input information by using a plurality of pieces of reference information, the apparatus comprising: an acquisition unit configured to set a plurality of reference locations of data in information as one reference location pattern and acquire a feature amount obtained from a value of data of one of the plurality of pieces of reference information in the one reference location pattern for each of a plurality of different reference location patterns and the plurality of pieces of reference information; an extraction unit configured to extract data included in the input information in accordance with each of the plurality of reference location patterns; a selection unit configured to select the reference location pattern used for classification of the input information from the plurality of reference location patterns based on a value of the extracted data; and an execution unit configured to execute classification of the input information by using the feature amount in the selected reference location pattern and data included in the input information at a reference location indicated by the reference location pattern.

According to one aspect of the present invention, there is provided an information processing apparatus comprising: a setting unit configured to set a plurality of weak classifiers; an evaluation unit configured to evaluate a processing result obtained by each of the plurality of weak classifiers with respect to values of data at a plurality of reference locations in input information; a selection unit configured to select one of the plurality of weak classifiers based on an evaluation result obtained by the evaluation unit; and an execution unit configured to execute classification of the input information by using the weak classifier selected by the selection unit.

According to one aspect of the present invention, there is provided an information processing method in an information processing apparatus which classifies input information by using a plurality of pieces of reference information, the method comprising: setting a plurality of reference locations of data in information as one reference location pattern and acquiring a feature amount obtained from a value of data of one of the plurality of pieces of reference information in the one reference location pattern for each of a plurality of different reference location patterns and the plurality of pieces of reference information; extracting data included in the input information in accordance with each of the plurality of reference location patterns; selecting the reference location pattern used for classification of the input information from the plurality of reference location patterns based on a value of the extracted data; and executing classification of the input information by using the feature amount in the selected reference location pattern and data included in the input information at a reference location indicated by the reference location pattern.

According to one aspect of the present invention, there is provided an information processing method in an information processing apparatus, the method comprising: setting a plurality of weak classifiers; evaluating a processing result obtained by each of the plurality of weak classifiers with respect to values of data at a plurality of reference locations in input information; selecting one of the plurality of weak classifiers based on an evaluation result obtained in the evaluating; and executing classification of the input information by using the weak classifier selected in the selecting.

According to one aspect of the present invention, there is provided a non-transitory computer-readable storage medium storing a computer program for causing a computer in an information processing apparatus to execute a code of setting a plurality of reference locations of data in information as one reference location pattern and acquiring a feature amount obtained from a value of data of one of the plurality of pieces of reference information in the one reference location pattern for each of a plurality of different reference location patterns and the plurality of pieces of reference information; a code of extracting data included in the input information in accordance with each of the plurality of reference location patterns; a code of selecting the reference location pattern used for classification of the input information from the plurality of reference location patterns based on a value of the extracted data; and a code of executing classification of the input information by using the feature amount in the selected reference location pattern and data included in the input information at a reference location indicated by the reference location pattern.

According to one aspect of the present invention, there is provided a non-transitory computer-readable storage medium storing a computer program for causing a computer in an information processing apparatus to execute a code of setting a plurality of weak classifiers; a code of evaluating a processing result obtained by each of the plurality of weak classifiers with respect to values of data at a plurality of reference locations in input information; a code of selecting one of the plurality of weak classifiers based on an evaluation result obtained by the code of evaluating; and a code of executing classification of the input information by using the weak classifier selected by the code of selecting.

Further features of the present invention will be apparent from the following description of exemplary embodiments with reference to the attached drawings.

BRIEF DESCRIPTION OF THE DRAWINGS

FIG. 5 is a view for explaining the data structure of a two-point reference location list;

FIG. 6 is a view for explaining a code/type correspondence table;

FIG. 14 is a view for explaining the data structure of an identification result list;

FIG. 15 is a flowchart showing the operation of evaluation value calculation processing in the second embodiment;

FIG. 16 is a view for explaining the data structure of a two-point reference location list in the third embodiment;

FIG. 19 is a block diagram showing the functional arrangement of an information processing apparatus according to the third embodiment.

DESCRIPTION OF THE EMBODIMENTS

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

<<First Embodiment>>

(Hardware Arrangement of Information Processing Apparatus)

Figure 1:
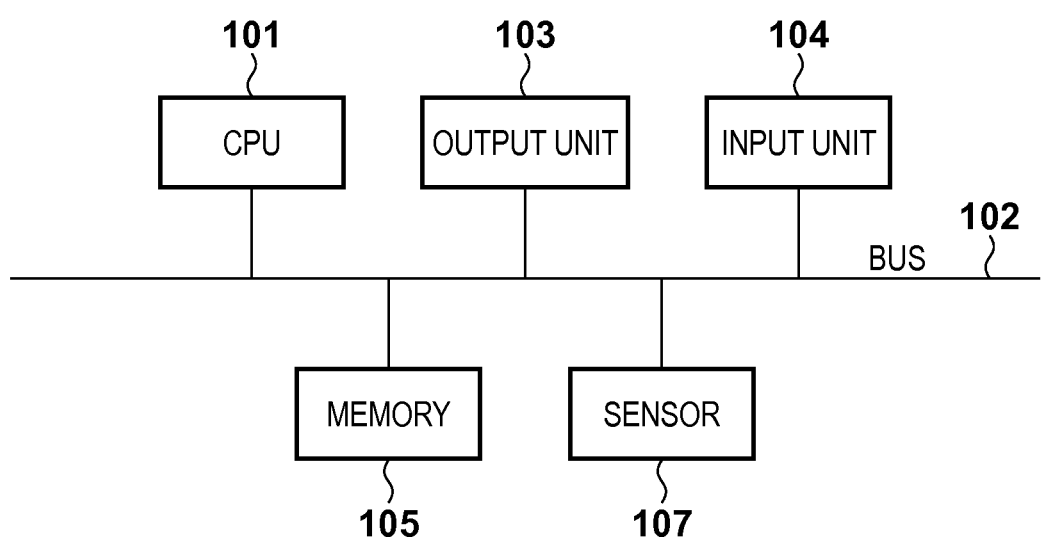
FIG. 1 is a block diagram showing an example of the hardware arrangement of an information processing apparatus.

FIG. 1 is a block diagram showing an example of the hardware arrangement of an information processing apparatus ccording to this embodiment. The information processing apparatus according to the embodiment includes a CPU 101, a bus 102, an output unit 103, an input unit 104, a memory 105, and a sensor 107.

The CPU 101 is a central processing unit, which executes programs and controls units. The output unit 103 is a display unit such as a CRT or LCD, and performs processing such as displaying a processing result and displaying input instructions. The input unit 104 includes a keyboard and a mouse, which perform processing such as inputting instructions from the user. The memory 105 holds programs for implementing information processing according to this embodiment, data, reference information to be learnt, dictionary generated by learning, and the like. The sensor 107 is a unit which acquires data representing an environmental status. When, for example, using a two-dimensional luminance image as input information or reference information, a camera which images a target object serves as the sensor 107. A case of using distance images in the second embodiment will be described later. In this case, a distance measurement unit which acquires distance data as data indicating an environmental status serves as the sensor 107. Although this embodiment acquires input information to be identified by using the sensor 107, for example, input information may be externally input. Note that when externally acquiring input information, it is possible to omit the sensor 107.

(Software Arrangement of Information Processing Apparatus)

Figure 2:
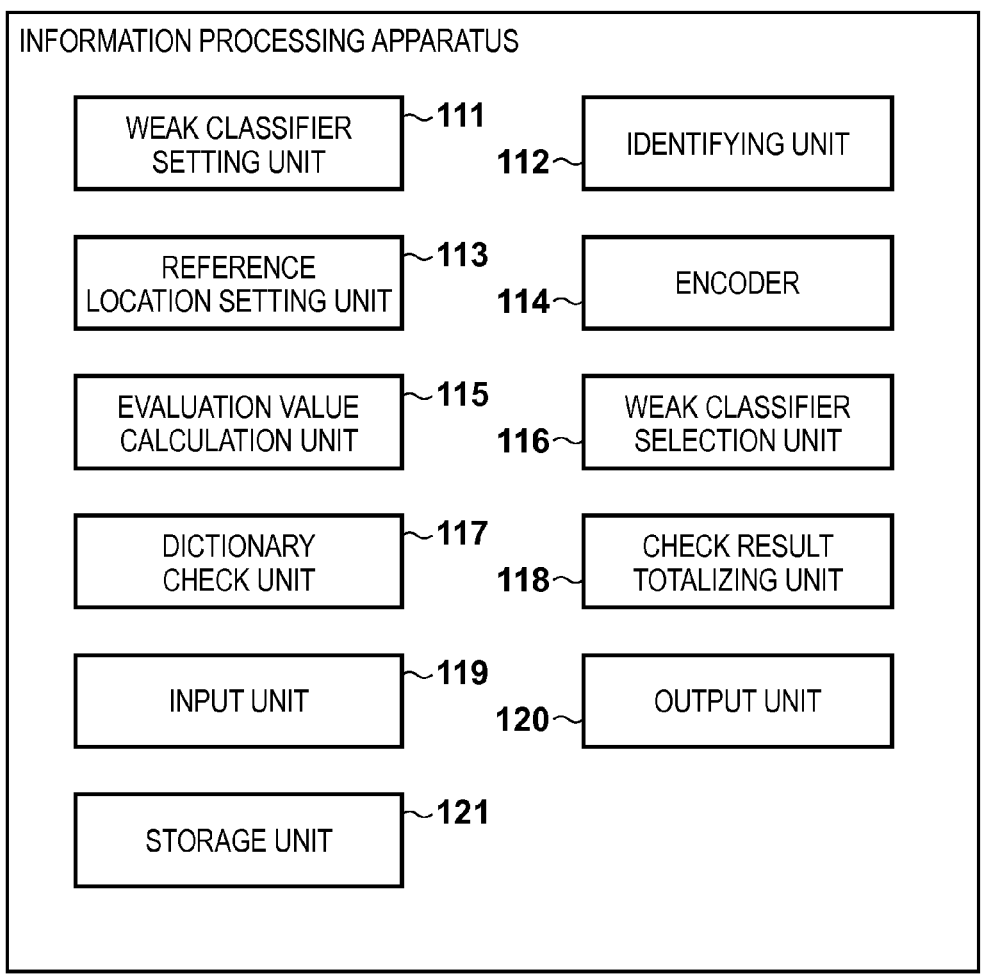
FIG. 2 is a block diagram showing the software functional arrangement of the information processing apparatus.

FIG. 2 is a block diagram showing the software functional arrangement of the information processing apparatus according to this embodiment. The information processing apparatus includes a weak classifier setting unit 111, an identifying unit 112, a reference location setting unit 113, an encoder 114, an evaluation value calculation unit 115, a weak classifier selection unit 116, a dictionary check unit 117, and a check result totalizing unit 118. The operation of each functional unit will be described in detail later. The information processing apparatus further includes an input unit 119, an output unit 120, and a storage unit 121.

Figure 3:
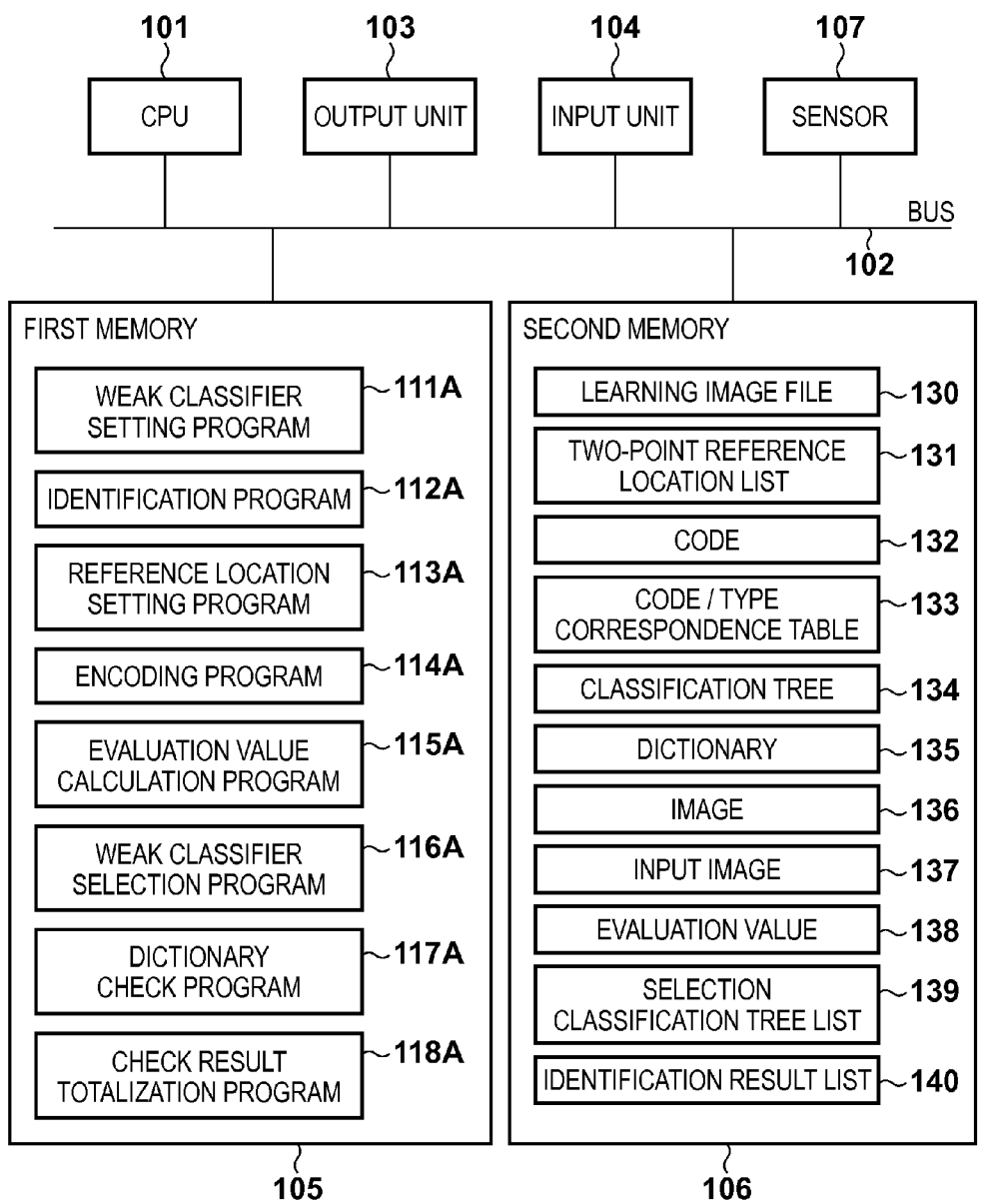
FIG. 3 is a block diagram showing another example of the hardware arrangement of the information processing apparatus.

Note that these functional units may be implemented by processing performed by a CPU 101 using the programs stored in a memory 105. FIG. 3 shows an example of a hardware arrangement in this case. For the sake of convenience, FIG. 3 shows the memory 105 divided into a first memory 105 and a second memory 106. The first memory 105 stores programs corresponding to the respective functional units described above. The second memory 106 stores information to be processed and intermediate information in processing. That is, the CPU 101 reads the respective programs stored in the first memory 105, executes the functions of the respective functional units by using the information stored in the second memory 106, and stores the resultant information in the second memory 106.

The operation of the information processing apparatus according to this embodiment will be described below based on the arrangements shown in FIGS. 2 and 3. For the sake of convenience, this apparatus includes two memories, that is, the first memory 105 for storing programs and the like and the second memory 106 for storing data and the like. However, this arrangement may be implemented by one memory or three or more memories.

(Learning Process)

Identification processing for input information in this embodiment will be described in detail below. The identification technique based on machine learning includes two processes, that is, a learning process of learning a classification tree by using reference information and an identification process of identifying input information. The weak classifier setting process of executing a learning process will be described first. The identification processing of executing an identification process will be described later.

The learning process is the same as that in the prior art. A technique of classifying input information according to the feature amounts calculated from values at a plurality of reference locations in reference information will be described in detail below.

Assume that a plurality of learning image files 130 are stored as reference information in the second memory 106 in advance in the following description. Note that in this embodiment, an image may not be a simple luminance image, and may be the feature amount image (edge intensity map or the like) obtained by performing various types of feature extraction such as edge extraction and edge enhancement for a luminance image.

For the sake of simplicity, assume that in this case, one image is stored per type of reference information as an identification target. However, a plurality of variation images may be stored per type of reference information. Identification information representing a type of reference information may be associated with each image in the learning image file 130. Although any type of association method may be used, assume that each type of reference information is represented by an identifier constituted by unique consecutive numbers starting from 1, and each identifier is used as an image file name. For example, a file representing an identifier of 000001 of a type of reference information is stored with the name "000001.bmp".

Although image identifying operation will be mainly described in the following description, information other than images may be identified. In this case, information of the same type as an identification target is held as reference information in place of the learning image file 130. That is, if, for example, speech information is input information to be identified, reference information is also speech information; and if temperature information obtained by observation is input information, reference information is also temperature information.

Figure 4:
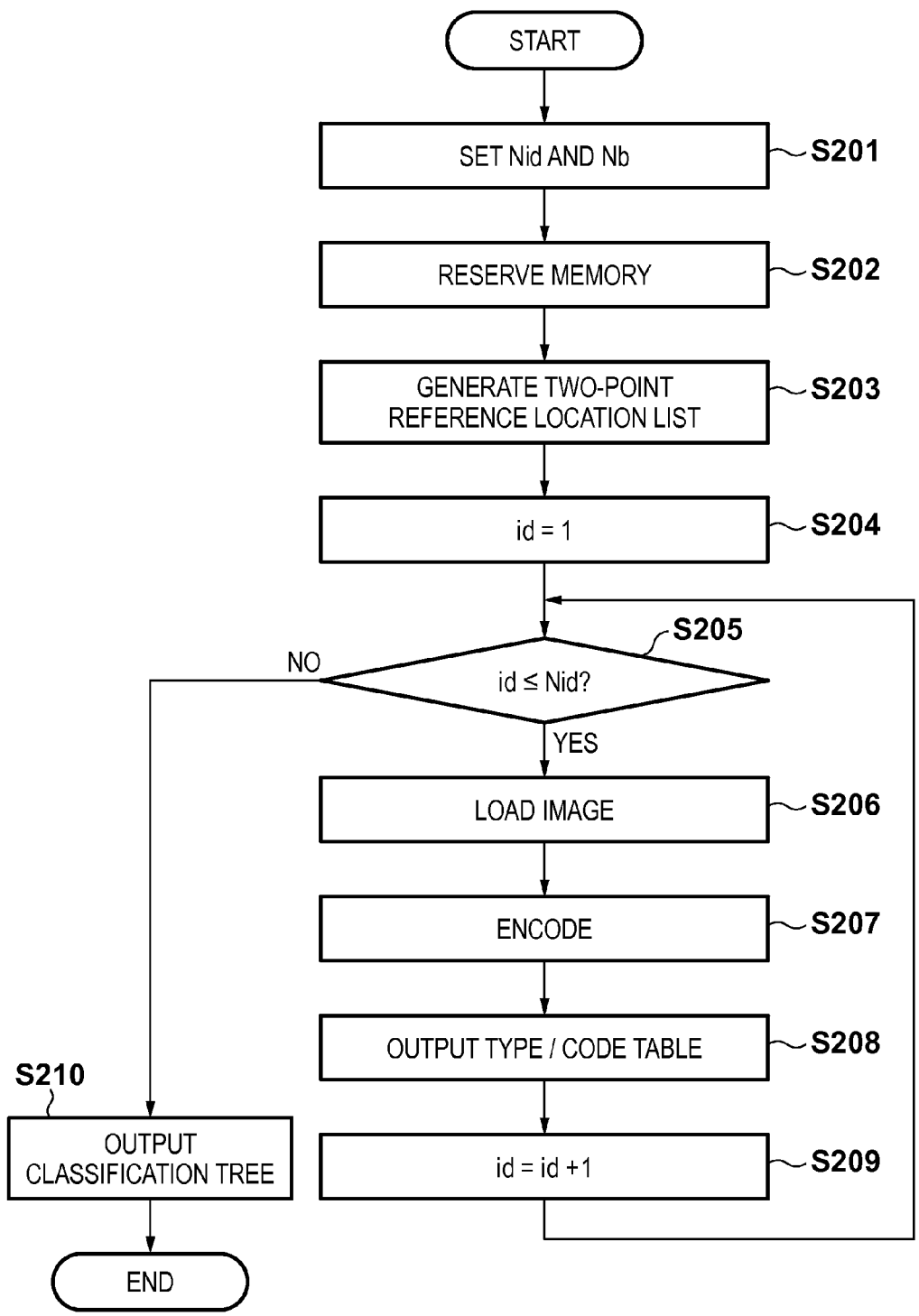
FIG. 4 is a flowchart showing the operation of learning processing for one classification tree.

FIG. 4 is a flowchart for explaining the operation of a classification tree learning process in this embodiment. The following will describe a process of learning one classification tree and generating a classification tree 134. As will be described later, in learning processing, this apparatus repeats a classification tree generation procedure a plurality of times, and generates a dictionary 135 by combining a plurality of generated classification trees 134. The processing of combining the plurality of classification trees 134 into one dictionary 135 will be described in detail later with reference to FIG. 8.

In the processing shown in FIG. 4, first of all, the weak classifier setting unit 111 sets the number of types of reference information to be identified and the number of bits for encoding (step S201). As this setting method, for example, the user may designate pieces of information by inputting them with the input unit 104 or the apparatus may read a setting file generated in advance. Other methods may be used. In the following description, the number of types of reference information to be identified is represented by Nid, and the number of bits for encoding is represented by Nb. It is possible to set the number Nb of bits to a sufficiently large value to allow the assignment of different codes to Nid different types of reference information. That is, it is possible to set the number Nb so as to satisfy 2Nb>Nid.

The apparatus then reserves an area for storing various types of information in the memory 106 (step S202). More specifically, the apparatus reserves, in the memory 106, a memory area for an Nb-bit binary code 132 and a memory area for a code/type correspondence table 133 indicating the correspondence between codes and types.

The reference location setting unit 113 then generates Nb pairs (x1, y1) and (x2, y2) of two-point reference locations on a learning image, and stores them as a reference location pattern in a two-point reference location list 131 in the memory 106 (step S203). The reference location setting unit 113 generates values at the locations of reference points using random numbers as in a conventional technique like that described by Mustafa. The reference location setting unit 113 may generate values at the locations of reference points by other methods. For example, the reference location setting unit 113 may determine reference points so as to easily select locations near the center of an image or may determine reference points so as to easily select locations exhibiting high probabilities of high luminance values on an image. In this embodiment, the method to be used is not specifically limited, and any method can be used as log as it can set reference point locations.

The two-point reference location list 131 indicates a specific pattern of two-point reference locations for reference to pixel values or the values of feature amount on an image. As shown in FIG. 5, this list is an array of Nb two-point pairs constituted by (x, y) coordinate values. In this array, (x1, y1) represent the image coordinates of the first reference location on the image, and (x2, y2) represent the image coordinates of the second reference location on the image. In the notation x1($b$), ($b$) represents the bth two-point reference location of the Nb two-point reference locations. The reference location pattern stored as the two-point reference location list 131 is used for both a learning process and an identifying process (to be described later).

Subsequently, the apparatus initializes a variable id which is a variable representing the type of reference information to be learnt and sets the variable to "1" (step S204). The apparatus then determines whether the variable id is equal to or smaller than the number Nid of types of reference information to be identified, that is, processing such as encoding is complete for all the types of reference information (step S205). If the variable id is equal to or smaller than the number Nid (YES in step S205), the process advances to step S206. If the variable id exceeds the number Nid (NO in step S205), the process advances to step S210 to output a classification tree.

In step S206, the apparatus extracts a learning image corresponding to the variable id from the learning image file 130 as an image 136 in the memory 106. In this embodiment, the learning image file 130 stores a number representing the type of reference information as a file name in the memory. This makes it possible to easily load a proper learning image by searching for an image file having, as a file name, a number identical to the variable id representing the identifier of the type of reference information.

Subsequently, the encoder 114 encodes the image 136 in accordance with the two-point reference location list 131 stored in the memory 106, and stores the obtained code in the area for the code 132 in the memory 106 which is reserved in step S202 (step S207). Reference numeral 132 denotes a binary code constituted by Nb bits, as described above.

Figure 10:
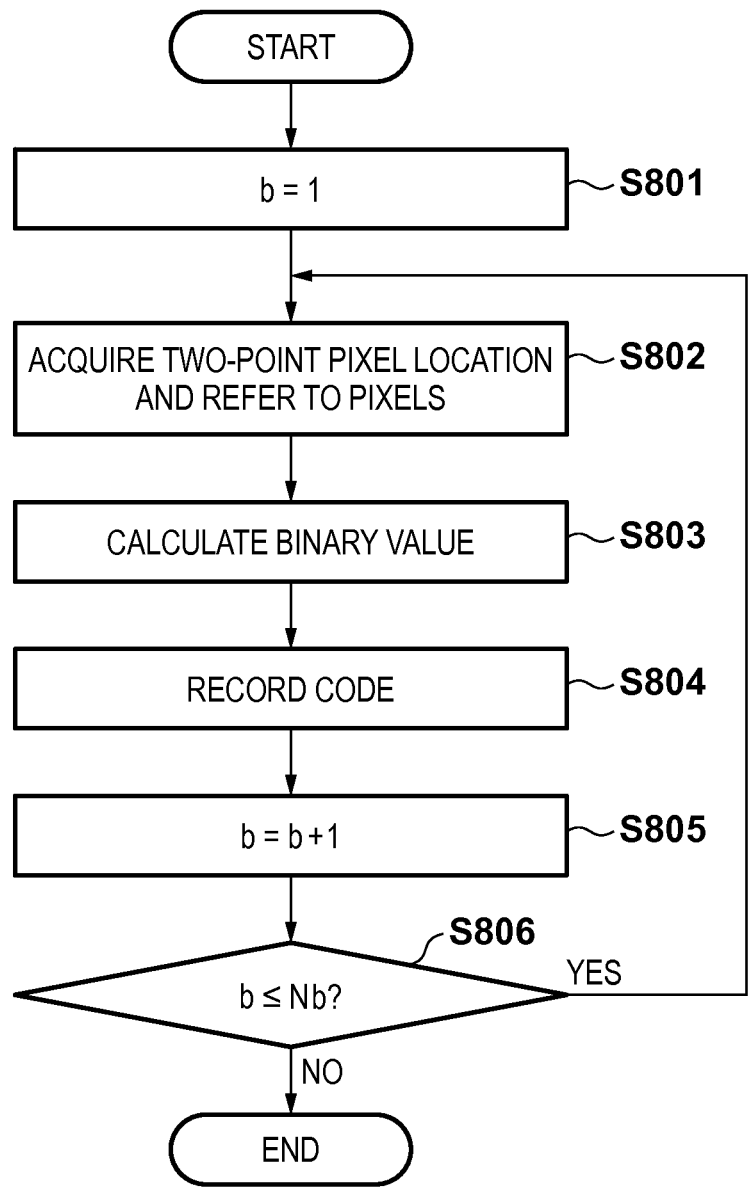
FIG. 10 is a flowchart showing the operation of encoding processing.

The operation of encoding processing by the encoder 114 will be described with reference to FIG. 10. In this processing, the encoder 114 uses Nb (the number of bits to be encoded) determined in step S201 in FIG. 4. The value Nb is transferred as an argument for processing for the encoder 114.

First of all, the encoder 114 initializes the variable b representing the number of bits to be encoded and sets it to "1" (step S801). The encoder 114 then acquires pairs of reference locations to be referred to on the image 136 from the reference location pattern of the two-point reference location list 131 stored in the memory 106 (step S802). That is, first of all, the encoder 114 extracts a pair (x1($b$), y1($b$)) and (x2($b$), y2($b$)) of the reference locations of two points from the reference location pattern of the two-point reference location list 131. The two-point reference location list 131 has, for example, an arrangement like that shown in FIG. 5. Therefore, determining the variable b will obtain a pair of two reference locations. The encoder 114 then acquires the pixel values of the two obtained reference locations (step S802). Note that the pixel value at a pixel location (x, y) corresponding to the type id of reference information is represented by IMG(id)[x, y]. That is, IMG(id)[x, y] represents the value of the pixel at the location (x, y) on the image 136 as the learning image corresponding to the variable id representing the identifier of the type of reference information. Letting L1 be a pixel value at the first reference location, and L2 be a pixel value at the second reference location, the pixel values L1 and L2 can be expressed as follows:

$$L1=IMG(id)[x1(b),y1(b)] \quad (1)$$

$$L2=IMG(id)[x2(b),y2(b)] \quad (2)$$

The encoder 114 then calculates a binary value bit(b) based on the values of L1 and L2 (step S803). Note that bit(b) is a function of outputting binary values in such a manner that if L1−L2>0, then 1 is output, whereas if L1−L2≤0, then 0 is output. Although bit(b) does not directly take the variable b as an argument, L1 and L2 are determined by the variable b, and the binary value to be output is determined by the variable b. For this reason, this function is written as a function of the variable b. Upon calculating a binary value, the encoder 114 changes a binary value of bits, of the number of bits in the area of the code 132 reserved in the memory 106, which correspond to the variable b to the calculated value of bit(b) (step S804).

The encoder 114 adds 1 to the variable b (step S805), and determines whether the processing is complete for the entire number of bits, that is, whether encoding is complete for all the reference locations of the reference location pattern of the two-point reference location list 131 (step S806). If the processing is complete for the entire number of bits (NO in step S806), the encoder 114 terminates the processing. If the processing is not complete for the entire number of bits (YES in step S806), the process returns to step S802 and the encoder 114 repeats the above processing. With the above encoding processing, the Nb-bit binary value is set in the code 132 in the memory 106.

Referring back to FIG. 4, the apparatus stores the code 132 and the variable id, stored in the memory 106, in the code/type correspondence table 133 in the memory 106 in association with each other (step S208). FIG. 6 shows the structure of the code/type correspondence table 133. This is a table having Nid pairs of binary codes 401 corresponding to the codes 132 and reference information identifiers 402 corresponding to the variables id. FIG. 6 shows an example of Nb=8. The apparatus uses such a table to store the codes 132 and the variables id as the identifiers of reference information in association with each other. The apparatus then adds 1 to the variable id (step S209) and returns to step S205.

The processing of outputting a classification tree in step S210 will be described next. In step S210, the apparatus outputs the two-point reference location list 131 and code/type correspondence table 133 stored in the memory 106 to the classification tree 134 in the memory 106.

Figure 7:
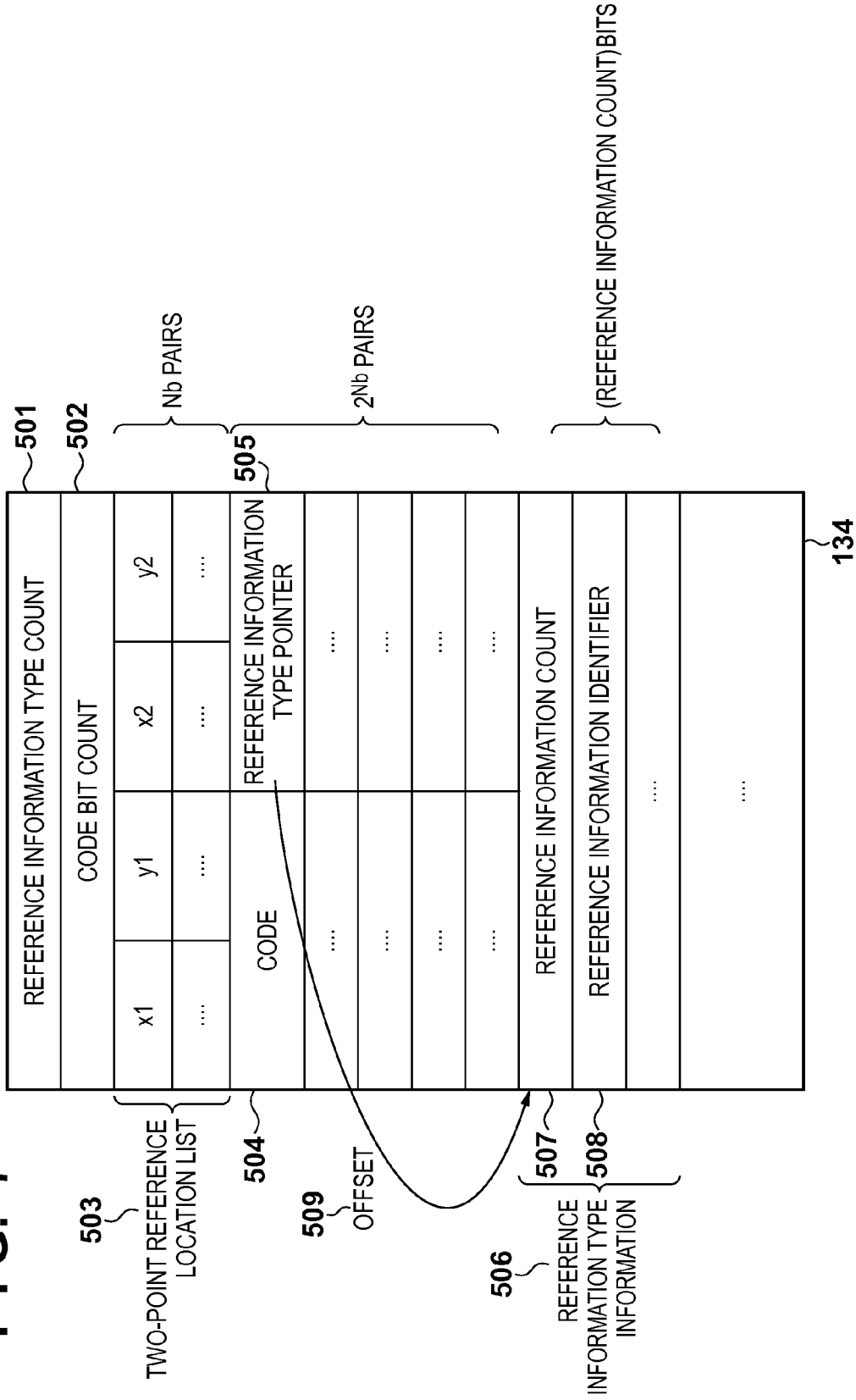
FIG. 7 is a view for explaining the data structure of a classification tree.

FIG. 7 shows the data structure of the classification tree 134. The first part of the classification tree data includes a reference information type count 501, a code bit count 502, and a two-point reference location list 503. Nid and Nb set in step S201 in FIG. 4 and the two-point reference location list 131 stored in the memory 106 are stored in them without any change. Note that if all classification trees have the same Nid and Nb, one of these two pieces of information may be stored in the dictionary 135. In consideration of the case in which these pieces of information differ from each other for each classification tree, the following will exemplify the case in which these pieces of information are stored for the respective classification trees. The following part of the classification tree data is a table indicating codes and the types of reference information corresponding to the codes. As shown in FIG. 7, this table is a correspondence table of codes 504 and reference information type pointers 505. Since there is a possibility that a plurality of types of reference information correspond to one code, this table is a correspondence table of one code and a pointer indicating reference information type information 506. Since the number of types of codes 504 is equal to the number of types of Nb-bit binary codes, there are 2Nb correspondence tables. The codes 504 are sorted in ascending order to binary bits from 0 to 2Nb−1.

The reference information type pointer 505 is an offset indicating a data location at which the identifiers of one or more pieces of reference information corresponding to the code 504 are stored. The arrow of an offset 509 in FIG. 7 indicates a relationship with offsets. That is, in the reference location pattern represented by the two-point reference location list 503, a list of the identifiers of reference information from which a given code 504 is obtained is stored at the location indicated by the reference information type pointer 505 in the code/type correspondence table. Referring to FIG. 7, the reference information type information 506 is a memory for storing the identifiers of one or more pieces of reference information. Reading out the offset 509 allows to access the reference information type information 506 corresponding to a given code 504. The reference information type information 506 is formed from a list of reference information counts 507 and reference information identifiers 508. The reference information identifier 508 is identical to the reference information identifier 402 in FIG. 6. The reference information identifiers 508 are stored as a list of reference information identifiers 508 equal in number to the reference information count 507. That is, when acquiring the reference information identifiers 508 corresponding to the given code 504, the apparatus reads first the reference information count 507 in accordance with the offset designated by the reference information type pointer 505, and acquires the reference information identifier 508 following the reference information count 507. At this time, since the number of reference information identifiers 508 corresponding to the code 504 is stored in the reference information count 507, the apparatus acquires the reference information identifiers 508 equal in number to the count. This makes it possible to acquire a list of a plurality of reference information identifiers 508 corresponding to the code 504 as a key.

In the processing in step S210, the apparatus analyzes the contents of the code/type correspondence table 133 stored in the memory 106, and forms the reference information type information 506 so as to have a data structure like that described above. Since the correspondence relationship between the codes 504 and the types of reference information is written in the code/type correspondence table 133 in FIG. 6, the apparatus can easily execute this processing. Subsequently, the apparatus writes out the reference information type information 506 corresponding to the information in the code/type correspondence table 133 up to the end of the data.

Even if all the images in the learning image file 130 are encoded in the process of learning processing, codes of all patterns do not appear. That is, the reference information identifiers 508 corresponding some codes do not exist. In this case, binary codes 401 in the code/type correspondence table 133 do not include such codes. For this reason, the classification tree 134 has "NULL" set the reference information type pointer 505 corresponding to such a code to indicate that there is no reference information identifier 508 corresponding to the code. With the above processing, the apparatus records the classification tree 134 which has learnt the learning image file 130 in the memory 106, and terminates the processing of learning one classification tree.

As described above, the processing described with reference to FIG. 4 is the processing of learning only one classification tree 134. In weak classifier setting processing, the apparatus learns a plurality of classification trees 134 by using a plurality of reference location patterns, and generates a dictionary by combining the plurality of classification trees. This processing will be described below.

First of all, to learn a plurality of classification trees 134, the apparatus repeats the processing of learning one classification tree described with reference to FIG. 4 a plurality of times. In this case, in the repetitive processing, when generating a two-point reference location list in step S203, the apparatus does not generate the same reference location pattern as that used in the past. The apparatus calculates different codes 132 for the same image 136 by performing encoding using different reference location patterns for the respective repetitive operations, thereby generating the different classification trees 134 by the number of times of repetitive operations. Although FIG. 3 shows only one memory for the classification tree 134, a storage area for a plurality of classification trees 134 may be reserved in the memory 106 in advance. This will generate a plurality of classification trees with different contents, and hence can generate one dictionary 135 by combining the classification trees. The apparatus stores this dictionary in the memory 106. A method of combining a plurality of classification trees will be described below.

Figure 8:
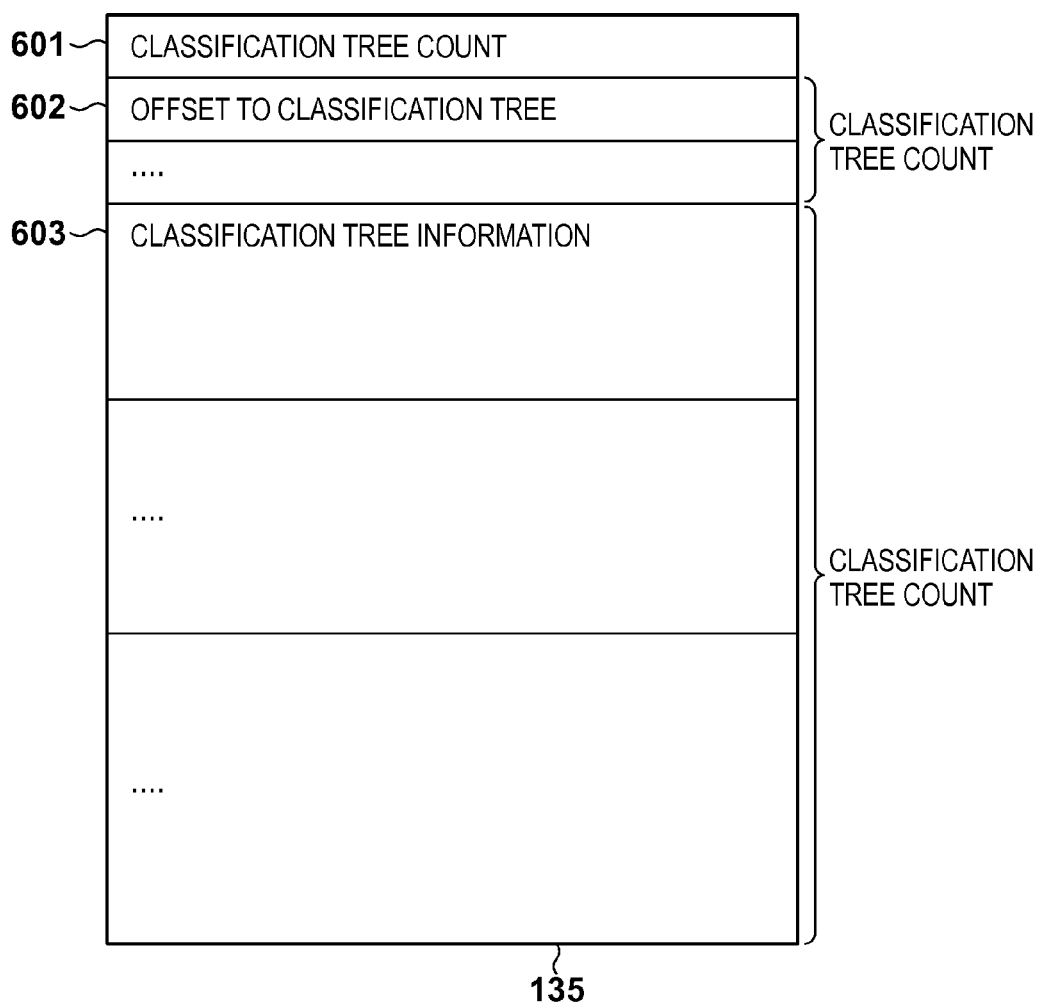
FIG. 8 is a view for explaining the data structure of a dictionary.

FIG. 8 shows an example of the file structure of the dictionary 135. First of all, the apparatus stores a classification tree count 601 to be contained in the dictionary 135, and then stores an offset 602 for the information of each classification tree. The classification tree count 601 indicates the number of reference location patterns used for learning. The number of offsets 602 to classification trees is equal to the classification tree count 601. This makes it possible to access the head of each piece of classification tree information 603. The pieces of classification tree information 603 follow by the classification tree count 601. The contents of the classification tree information 603 are the same as those of the classification tree 134. In the above manner, the apparatus generates the dictionary 135, and terminates the weak classifier learning processing.

(Identification Process)

Figure 9:
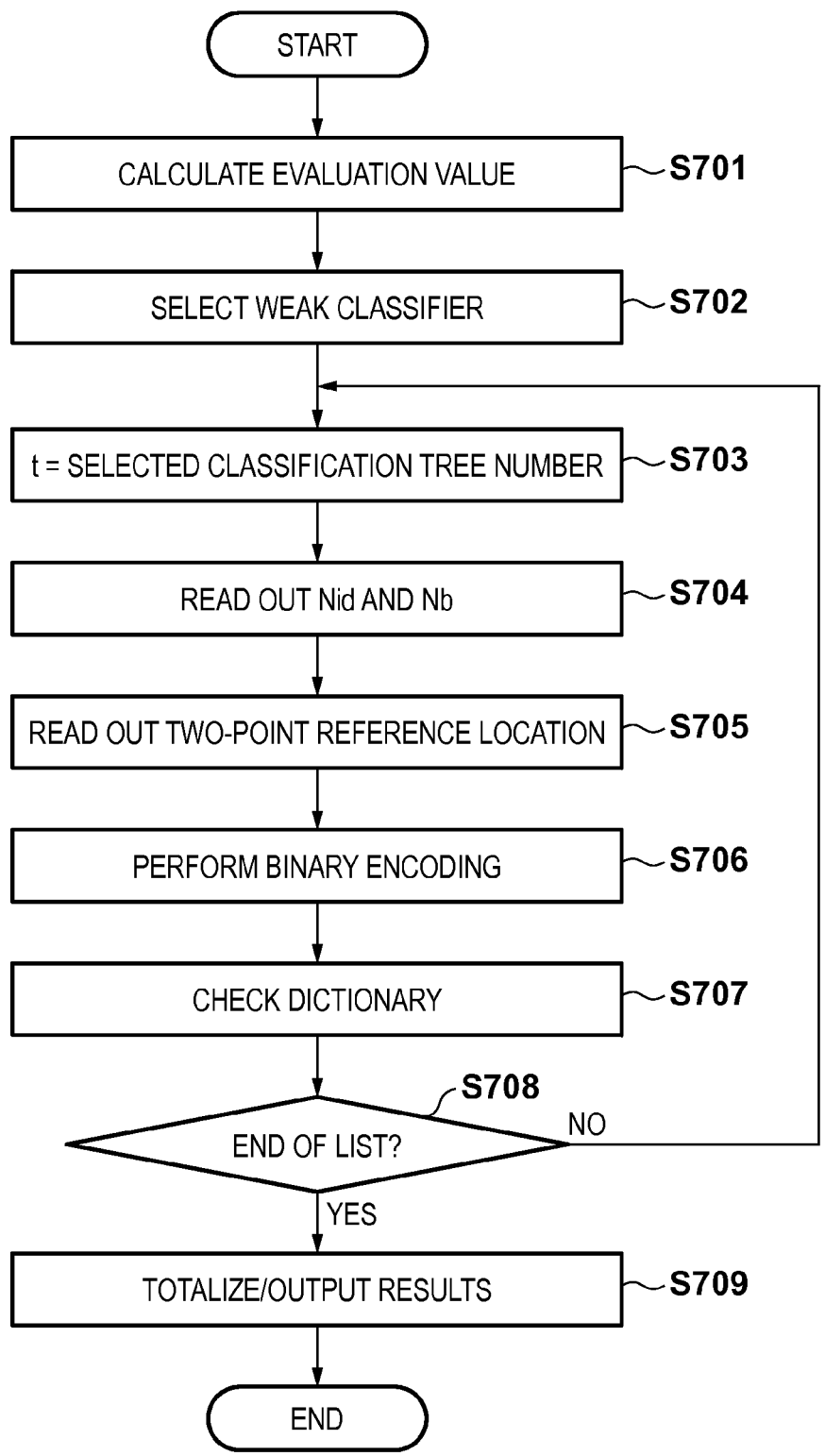
FIG. 9 is a flowchart showing the operation of identification processing.

An identification process will be described next. A rough procedure for processing in an identification process will be described first with reference to FIG. 9. In the identification process, the apparatus acquires pixel values of an input image 137 and performs encoding processing in accordance with the reference location pattern based on the two-point reference location list 131, checks the obtained code with the dictionary 135, and outputs the identifier of reference information as an identification result. Assume that in this case, the input image 137 has been externally acquired before the start of identification processing and stored in the memory 106. For example, the images acquired in advance by the sensor 107 such as a camera are stored in advance.

When identification processing starts, the evaluation value calculation unit 115 executes evaluation value calculation processing first (step S701). In the evaluation value calculation processing, the evaluation value calculation unit 115 performs the processing of calculating evaluation values 138 of a plurality of classification trees, for the input image 137, stored in the dictionary 135. In calculation processing for the evaluation values 138, higher evaluation values 138 are assigned to the classification trees 134 as they are regarded to allow more accurate identification by a plurality of reference locations based on the two-point reference location list 131. That is, it is possible to use the classification tree 134 corresponding to a reference location pattern with the high evaluation value 138 for identification. The evaluation values 138 are stored in the memory 106 in the form of a list of pairs of the numbers of classification trees and evaluation values corresponding to them. The details of evaluation value calculation processing will be described later.

Subsequently, the weak classifier selection unit 116 executes weak classifier selection processing (step S702). Note that "weak classifier selection" in this case is to determine which one of the classification trees 134 described above should be used for identification. The weak classifier selection unit 116 performs weak classifier selection processing to select the classification tree 134 to be used for identification in accordance with the evaluation value 138 obtained as the evaluation result of each classification tree, and store the number of the selected classification tree 134 in the form of a selection classification tree list 139 in the memory 106. The selection classification tree list 139 is a list which includes, for example, "3" and "5" if the use of the third and fifth classification trees is determined. The details of weak classifier selection processing will also be described later.

In step S703 and the subsequent steps, the apparatus identifies an input image by using the classification trees 134 recorded on the selection classification tree list 139. First of all, the apparatus sets a variable t indicating the number of the classification tree 134 in the dictionary 135 (step S703). In this case, the apparatus extracts the first item (classification tree number) of the selection classification tree list 139, and sets it to the variable t. At the same time, the apparatus deletes the first item from the selection classification tree list 139. That is, since "3" and "5" are stored in the selection classification tree list 139 described above, the apparatus sets t to "3", and deletes "3" from the selection classification tree list 139. In step S704 and the subsequent steps, the apparatus can access the information of the tth classification tree by using the offset 602 to the classification tree in the dictionary 135. The information of the classification tree is stored as the classification tree information 603 in the dictionary 135. FIG. 7 shows the contents of the information.

In step S704, the apparatus accesses the tth classification tree in the dictionary 135 to read the reference information type count 501 and the code bit count 502, and stores them in variables Nid, and Nb, respectively. Assume that the same reference information type count and the same code bit count are used for all classification trees. In this case, if only one of these pieces of information is stored in the dictionary 135, the apparatus accesses the information to set the variables Nid and Nb.

The apparatus then reads out all the two-point reference location list 503 from the tth classification tree, and stores it in the two-point reference location list 131 in the memory 106 (step S705). Subsequently, the encoder 114 encodes the input image 137 in accordance with the reference location pattern of the two-point reference location list 131 (step S706). The apparatus then stores the resultant data as the code 132 in the memory 106. The encoding processing is the same as that in the learning process. In this case, the code 132 is the code for detection which is obtained by encoding the input image for detection.

The dictionary check unit 117 then executes dictionary check processing (step S707). In the dictionary check processing, the dictionary check unit 117 checks the dictionary 135 by using the obtained code 132 for detection as a key. The variable t is provided as an argument for the dictionary check processing. The dictionary check processing will also be described later.

Subsequently, the apparatus determines whether the selection classification tree list 139 is empty (step S708). If the list is not empty, the process returns to step S703 to set the first item (classification tree number) of the list to t and subsequently repeat the above processing. If the selection classification tree list 139 is empty, the check result totalizing unit 118 executes the check result totalization processing of totalizing identification results and outputting identification results (step S709). The check result totalization processing will also be described later. In the case of the selection classification tree list 139 described above, since "5" is left in the list at this time, the apparatus sets t to "5" and repeats the above processing. When the series of processing is complete concerning t=5, since the selection classification tree list 139 is empty, the process shifts to the check result totalization processing.

A rough procedure for identification processing has been described above. The evaluation value calculation processing (step S701), weak classifier selection processing (step S702), dictionary check processing (step S707), and check result totalization processing (step S709) will be sequentially described in detail below.

(Evaluation Value Calculation Processing)

In the evaluation value calculation processing, the apparatus calculates the evaluation values 138 indicating how much the respective classification trees (weak classifiers) stored in the dictionary 135 are effective for the identification of the input image 137. Each weak classifier used in this embodiment is configured to classify an image by using, as a feature amount, a comparison result between data values (for example, the luminance values or edge intensities of the image) at two reference points on the image. In order to obtain a robust feature amount, that is, a feature amount having sufficient resistance to an error, it is possible to refer to two points whose comparison result does not change due to slight noise. It is therefore more effective to use a classification tree which performs classification by referring to reference locations exhibiting a large difference between data values than to use a classification tree which performs classification by referring to reference locations exhibiting a small difference between data values. For this reason, in this embodiment, the apparatus calculates the evaluation values of classification trees by extracting luminance values of the input image 137 according to a plurality of reference location patterns used to obtain the classification trees 134 in the dictionary 135 and performing the processing of increasing an evaluation value with an increase in the luminance value difference between the two-point reference locations. Two-point reference locations exhibiting a small luminance difference cause an error in classification. A case in which the minimum luminance difference is set as the evaluation value of a classification tree will therefore be described below.

Figure 11:
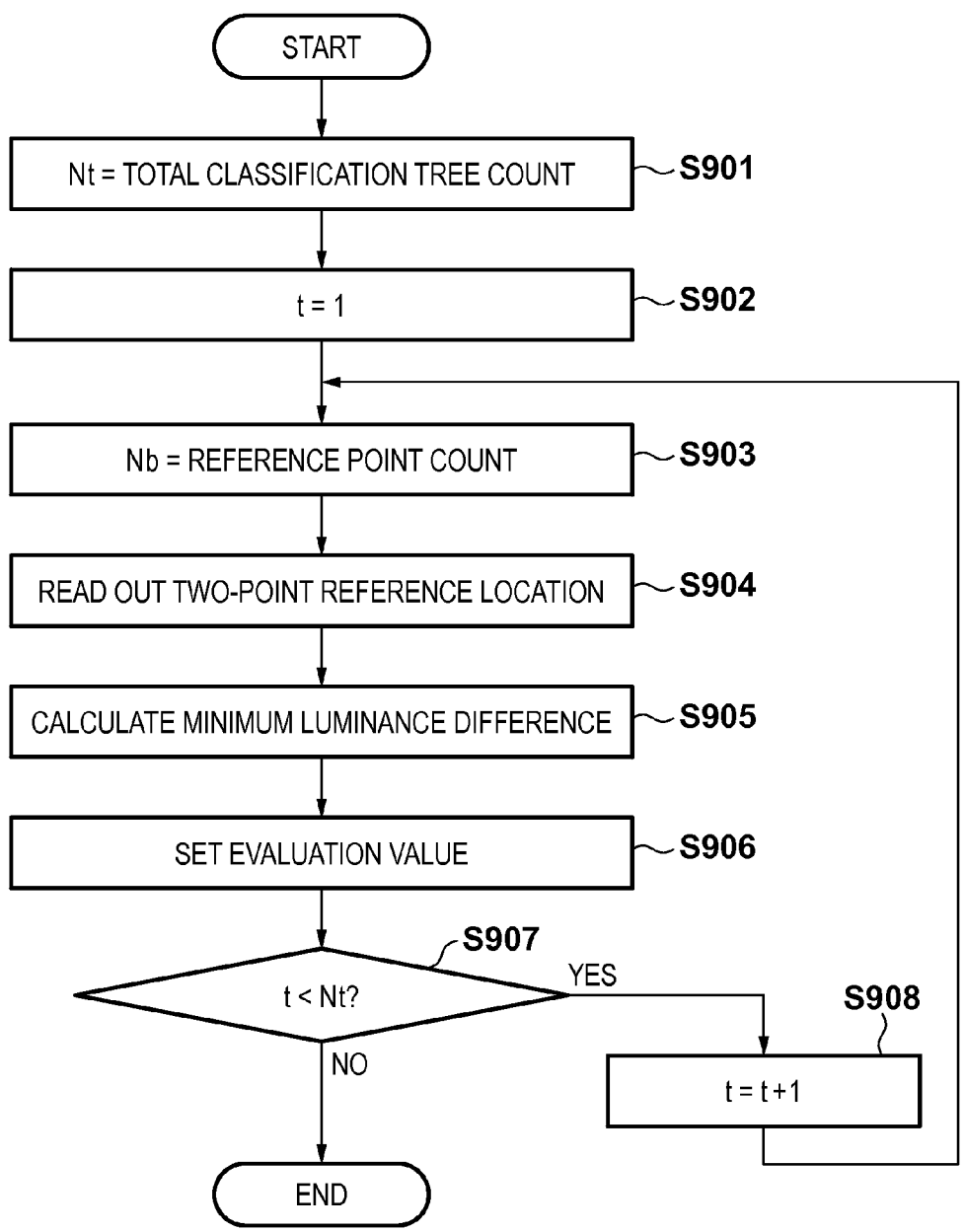
FIG. 11 is a flowchart showing the operation of evaluation value calculation processing.

FIG. 11 is a flowchart for explaining the operation of the evaluation value calculation processing in this embodiment. First of all, the apparatus reads out the total number of classification trees from the classification tree count 601 of the dictionary 135, and sets it to the variable Nt (step S901). The apparatus then initializes the variable t and set it to "1" (step S902). The variable t indicates the number of a classification tree. The apparatus then reads out the code bit count 502 of the tth classification tree 134 from the dictionary 135 and sets it to the variable Nb (step S903). Note that the code bit count 502 is the number of two reference points used to generate the classification tree 134. The apparatus reads out the reference location pattern used to generate the tth classification tree 134 from the two-point reference location list 503 of the classification tree 134 (step S904). The apparatus reserves a storage area (not shown) for a two-point reference location list in the memory 106 and reads the two-point reference location list 503 to the area in accordance with, for example, the variable Nb set in step S903.

The apparatus then calculates all the absolute values of luminance value differences at two-point reference locations read in step S904 with respect to the input image 137, and obtains the minimum value (step S905). More specifically, the apparatus extracts luminance values L1 and L2 at the two-point reference locations based on equations (1) and (2), and calculates the absolute values of luminance value difference |L1−L2|. The apparatus calculates the minimum value of |L1−L2| among all the pairs of L1 and L2 included in the two-point reference location list 503.

Subsequently, the apparatus sets the number t indicating the classification tree 134 and the minimum luminance value difference as the calculation processing result in step S905 in the evaluation value 138 in the memory 106 in association with each other (step S906). The evaluation value 138 is a list of a pair of the number t indicating the classification tree 134 and the minimum luminance value difference. When the apparatus determines whether the above processing has been performed for all the classification trees recorded in the dictionary 135, and calculates evaluation values for the processing results on all the classification trees (NO in step S907), the apparatus terminates the processing.

As described above, the evaluation value calculation processing in this embodiment uses the minimum luminance value difference as an evaluation value. This makes it possible to set the evaluation value 138 to a low value, which is obtained by a reference location pattern, of a plurality of classification trees, which includes a pair of reference locations exhibiting a small luminance difference on an input image. The evaluation value 138 can indicate, for each reference location pattern, the possibility that a code concerning an input image is reversed between 0 and 1 due to noise or the like. That is, it is possible to select a reference location pattern suitable for an input image. Note that selecting a classification tree exhibiting the high evaluation value 138 and using it for identification will encode an input image with a reference location pattern corresponding to the classification tree. This increases the probability that the obtained code has resistance to noise. This can improve the identification performance.

Note that this embodiment uses the minimum luminance value difference as an evaluation value. However, the embodiment may use other evaluation values. For example, it is conceivable to use some kind of statistics concerning the absolute values of luminance values at two-point reference locations as an evaluation value. For example, it is possible to use the sum total of the absolute values of luminance differences at all two-point reference locations as an evaluation value.

(Weak Classifier Selection Processing)

Figure 12:
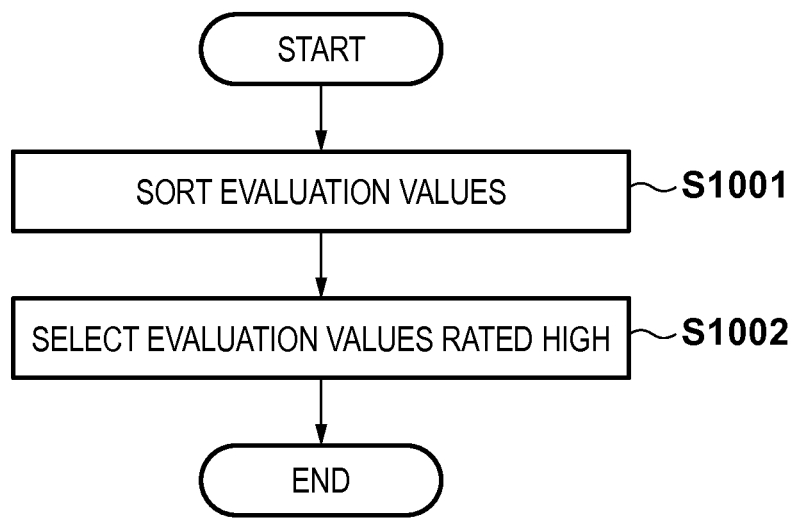
FIG. 12 is a flowchart showing the operation of weak classifier selection processing.

FIG. 12 is a flowchart for explaining the operation of the weak classifier selection processing. In the weak classifier selection processing in this embodiment, the apparatus selects classification trees based on evaluation results in the evaluation value calculation processing, that is, selects a predetermined number of classification trees, which is equal to or more than one, for example, in descending order of the evaluation values 138. First of all, the apparatus sorts the evaluation values 138 in the memory 106 according to their values (step S1001). The evaluation value 138 is a list of a pair of a number corresponding to the classification tree 134 and the evaluation value of the classification tree 134. In this case, the evaluation values 138 are sorted according to the evaluation values. The apparatus then selects numbers indicating a predetermined number of classification trees 134 from the top of the list of the evaluation values 138 sorted according to their evaluation values, and sets the selected numbers in the selection classification tree list 139 (step S1002). The selection classification tree list 139 is a slit of classification tree numbers. For example, the user inputs and sets a predetermined number by using the input unit 104. It is also possible to separately set a threshold for evaluation values to a predetermined value and include all the numbers of the classification trees 134 having evaluation values equal to or more than the predetermined value in the selection classification tree list 139. In this case, for example, the user inputs a predetermined value by using the input unit 104. Alternatively, input image data for evaluation may be prepared in advance to learn a value at which an identification error is difficult to occur, and the value may be set as a predetermined value.

With the above processing, the apparatus selects one or more classification trees 134 suitable for the classification of an input image from a plurality of classification trees 134 stored in the dictionary 135 based on evaluation result in the evaluation value calculation processing, and stores the numbers in the selection classification tree list 139.

(Dictionary Check Processing)

Figure 13:
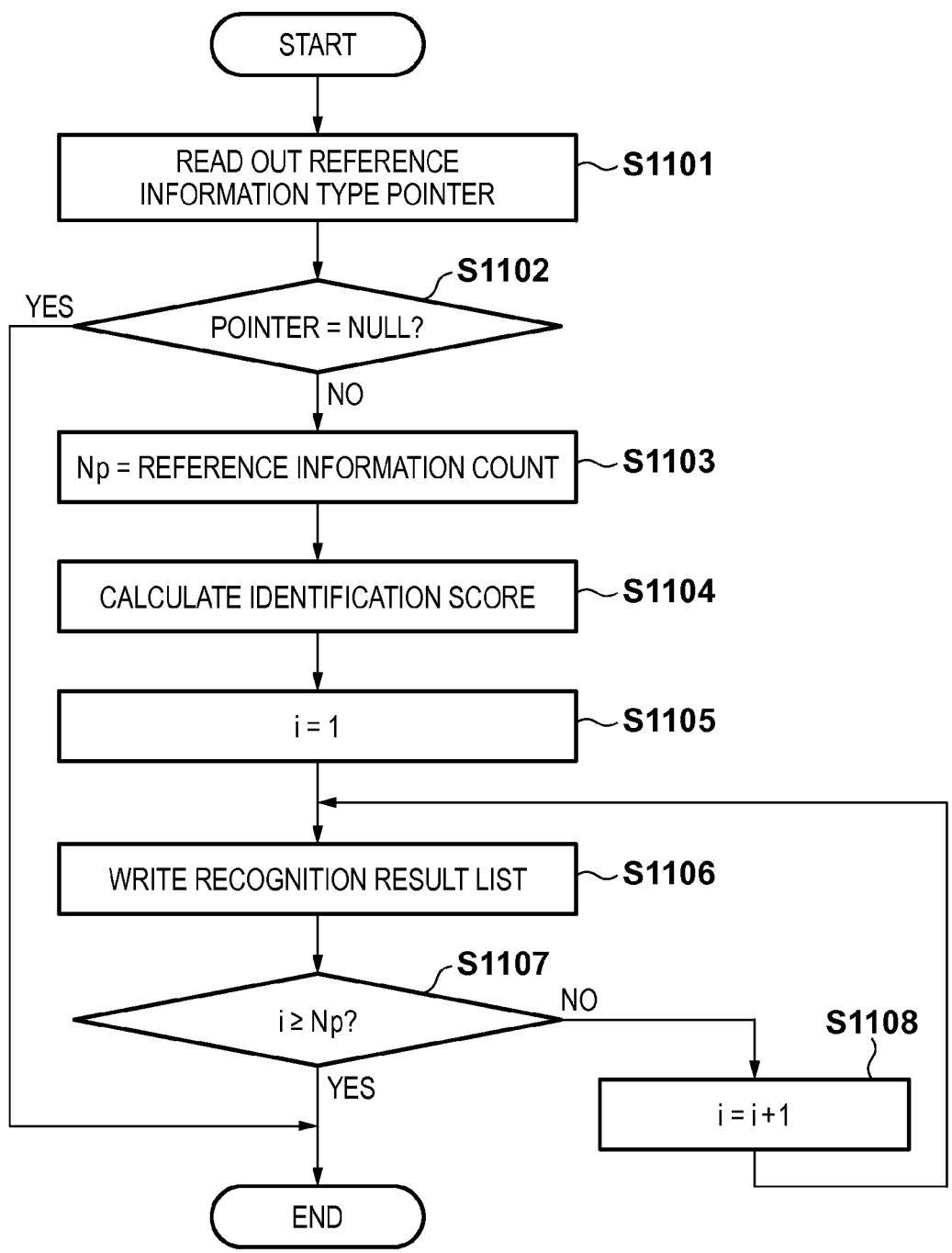
FIG. 13 is a flowchart showing the operation of dictionary check processing.

FIG. 13 is a flowchart for explaining the operation of the dictionary check processing. In this processing, upon starting the processing, the apparatus acquires the number t initially extracted in step S703. The apparatus then accesses the reference information type information 506 corresponding to the code 132 for detection obtained from the input image with respect to the classification tree 134 corresponding to the provided variable t.

More specifically, first of all, the apparatus reads out the reference information type pointers 505 corresponding to the code 132 for detection from the dictionary 135 with respect to the tth classification tree (step S1101). The apparatus accesses the information of the classification tree 134 corresponding to the variable t in the dictionary 135 by using the offset 602 to the tth classification tree. The apparatus accesses the reference information type information 506 by searching the codes 504 in FIG. 7 for a code matching the code 132 for detection and obtaining the corresponding reference information type pointer 505.

The apparatus then determines whether the reference information type pointer 505 read out in step S1101 is NULL (step S1102). If the pointer is NULL (YES in step S1102), since it indicates that no learning image corresponding to the code 132 for detection is provided at the time of learning, the apparatus terminates the processing. If the pointer is not NULL (NO in step S1102), the apparatus reads out the reference information count 507 from the dictionary 135 by using the reference information type pointer read out in step S1101 and sets it to a variable Np (step S1103). The apparatus then calculates an identification score provided for the reference information identifier obtained by dictionary check using the code 132 for detection as a key (step S1104). It is possible to use various identification score calculation methods. For example, the apparatus calculates a score as P according to equation (3) given below:

$$P=a/Np \qquad (3)$$

In this case, a variable a is a total score provided for a reference information identifier matching the code 132 for detection, which is, for example, 1.0 point, and Np represents the number of reference information types matching the code 132 for detection. Np is the reference information count 507 in FIG. 7, and is read out from the dictionary in step S1103. In the above case, a score of a=1.0 point is distributed to a plurality of reference information identifiers matching the code 132 for detection upon uniform weighting. According to this distribution, if the number of pieces of reference information corresponding to the same code 132 for detection large and indefiniteness is high, the identification score is low. In addition, if the code 132 for detection strongly indicates the characteristic of the reference information as in a case in which the number of pieces of reference information corresponding to the same code 132 for detection is smaller, for example, only one piece of reference information corresponds to the code 132, the score is increased. This prevents the common characteristic of a plurality of pieces of reference information from strongly influencing the identification performance and lets the characteristic of only specific reference information strongly influence the identification performance, thereby improving the identification performance.

Note that it is possible to calculate the identification score P by other methods. For example, the apparatus may provide the above variable a with the value calculated from the evaluation value of the classification tree used for dictionary check. More simply, the evaluation value itself may be provided for the variable. This makes it possible to assign a high score to an identification result matching the dictionary by using a classification tree with a high evaluation value. This allows to calculate an identification result with higher reliability being attached to a dictionary check result using a classification tree having a high evaluation value.

The apparatus then sets a variable i representing the ordinal number of a given reference information identifier 508 of Np pieces of reference information identifiers to 1 (step S1105). The apparatus reads out the ith reference information identifier 508 and causes the memory 106 to store the reference information identifier 508 in pair with the identification score P calculated in step S1104 in the form of an identification result list 140 (step S1106). FIG. 14 shows the data structure of the identification result list 140. The identification result list 140 is a list in which reference information identifiers 1301 and identification scores 1302 corresponding to the identifiers concerning an input image are written in pairs. In this case, if the identification result list 140 does not include the reference information identifier 508 whose identification score is calculated in step S1104, the apparatus newly adds a pair of the reference information identifier 508 and the identification score P to the identification result list 140. If the reference information identifier 508 whose identification score is calculated in step S1104 has already been stored in the identification result list 140, the apparatus adds the identification score P calculated in step S1104 to the identification score corresponding to the identifier in the identification result list 140.

Subsequently, the apparatus determines whether the variable i exceeds the variable Np (step S1107). If the variable i does not exceed the variable Np (NO in step S1107), since it indicates that there is still a reference information identifier matching the code 132 for detection, the apparatus adds 1 to i in step S1108 and returns to step S906. If the variable i exceeds the variable Np (YES in step S1107), the apparatus terminates the processing.

This is the end of the description of the operation of the dictionary check processing. In the repetitive execution of steps S703 to S707 in FIG. 9, the apparatus repeats the dictionary check processing described above. The apparatus converts the codes 132 for detection into identification scores by using a plurality of classification trees, adds the scores as identification scores for each reference information identifier, and records the resultant data in the identification result list 140.

(Check Result Totalization Processing)

In the check result totalization processing, the apparatus totalizes the identification result lists 140 stored in the memory 106 in the dictionary check processing. For example, the apparatus sorts the identification result lists 140 in descending order of the identification scores 1302, and displays/outputs one or more reference information identifiers having high identification scores to the output unit 103 (for example, a CRT) in FIG. 3.

As another example, the apparatus may output a plurality of reference information identifiers with identification scores equal to or higher than a threshold separately set for the value of the identification score 1302 in descending order, or may output a plurality of reference information identifiers in descending order of identification scores upon adaptively determining a threshold in accordance with the distribution of the identification scores 1302, or may output only one reference information identifier with the highest identification score. In addition, the output destination of an identification result (reference information identifier) is not limited to the output unit 103, and may be output to another apparatus (not shown) or output for another program. This is the end of the description of the check result totalization processing.

It is possible to improve the robustness of identification by selecting a reference location pattern effective for the input image 137 and performing identification by using classification trees corresponding to the reference location pattern with the above arrangement.

<<Second Embodiment>>

The first embodiment has exemplified the case in which a luminance image is handled as the reference information of an identification target. The second embodiment will exemplify a case in which identification is performed by using a distance image. A distance image expresses the distance from a camera to an imaging target in the form of an image. There are many known distance measurement methods for generating distance images. Typical examples are a light-section method, a stereo method, and the like.

In each distance measurement method, it is possible to measure a distance and define the reliability of a measured distance value at each pixel point of a distance image. For example, Japanese Patent Laid-Open No. 06-229771 discloses a light-section method in which it is possible to calculate the reliability of a distance value at each pixel point on a distance image based on the magnitude of the reception level of reflected light of projected slit light. Japanese Patent Laid-Open No. 07-129898 discloses a stereo method in which it is possible to calculate the reliability of a distance value at each pixel point on a distance image by checking the state of correlation between corresponding small regions of a plurality of images.

The procedure for processing in the second embodiment is almost the same as that in the first embodiment except that it handles a distance image as an input image, and performs calculation in evaluation value calculation processing by using the reliability of an input data value. These two points will be described below.

The first point described is that an input image is a distance image. There has been known a method of generating distance images by using a distance measurement unit. Adding a conventional distance measurement unit as the sensor 107 in the first embodiment shown in FIG. 1 to the arrangement of the second embodiment can acquire a distance image as data indicating an environmental status. Although a distance image is to be handled, this image is equivalent to a luminance image in that a two-dimensional location (x, y) allows to access a data value. A distance image is therefore handled in the same manner as a luminance image (halftone image) in the first embodiment. Note however that the learning image file 130, image 136, and input image 137 in FIG. 3 become those associated with distance images. In addition, although the first embodiment compares pixel values at two-point reference locations in encoding processing, the second embodiment compares pixel values (distance values in the case of a distance image) at two-point reference locations on a distance image and then performs encoding processing.

When acquiring a distance image as the input image 137, it is possible to generate a reliability map associating each pixel (distance value) of a distance image with its reliability, by using the conventional techniques disclosed in Japanese Patent Laid-Open Nos. 06-229771 and 07-129898. A reliability map expresses reliability values in the form of a two-dimensional array expressing reliabilities by distance values equal in size to the aspect ratio of a distance image. With this map, providing a reference location on a distance image allows to obtain the reliability value of a distance value at the reference location. Assume that this apparatus generates a reliability map (not shown) of distance values upon acquiring a distance image as the input image 137, and stores the map in a memory 106 in advance.

Evaluation value calculation processing in the second embodiment will be described next. FIG. 15 is a flowchart for explaining the operation of the evaluation value calculation processing in the second embodiment.

First of all, the apparatus reads out the total number of classification trees from a classification tree count 601 of a dictionary 135, and sets it to a variable Nt (step S1201). The apparatus then initializes a variable t indicating a classification tree number and sets it to "1" (step S1202). Subsequently, the apparatus reads out a code bit count 502 of a tth classification tree 134 from the dictionary 135, and sets it to a variable Nb (step S1203). The apparatus reads out a two-point reference location list 503 of a tth classification tree 134 (step S1204). The apparatus reads out reliability values at all the reference, locations included in the two-point reference location list 503 read out in step S1204 with respect to a reliability map of distance values in the memory 106, and extracts the minimum value among the readout reliability values (step S1205). The apparatus then sets a classification tree number t and the minimum reliability value calculated in step S1205 in the evaluation value 138 of the memory 106 (step S1206). The evaluation value 138 and the pair of the classification tree number t and the minimum reliability value calculated in step S1205 form a list. Subsequently, the apparatus determines whether the above processing has been performed for all the classification trees recorded in the dictionary 135 (step S1207). Upon completing the calculation of the evaluation values of all the classification trees (NO in step S1207), the apparatus terminates the processing.

Note that this embodiment only refers to the reliability at each point of two-point reference locations in selection of a classification tree but does not compare the reliabilities. On the other hand, the embodiment uses the classification tree obtained as a result of comparison between pixel values (distance values) in classification processing. That is, reliabilities are used only at the time of classification tree selection. For this reason, reliability data may be included in an input image, and only distance values may be stored in advance with respect to reference information.

As described above, it is possible to set the evaluation value of a classification tree to a low value with regard to a reference location pattern including reference locations exhibiting small reliability values with respect to an input distance image. In the above case, the minimum reliability value is set as an evaluation value. However, it is conceivable to use other evaluation values. For example, it is conceivable to use, as an evaluation value, some kind of statistics concerning reliability values at two-point reference locations. For example, the sum total of reliability values may be used as an evaluation value.

Note that in the arrangement of this embodiment, when a reliability is provided for each data value of input information, it is possible to calculate the reliability of each bit of a code from the reliability of input data. This makes it possible not to use any bit exhibiting low reliability for identification.

<<Third Embodiment>>

The first embodiment has exemplified the processing for luminance images. The second embodiment has exemplified the processing for distance images. The third embodiment will exemplify the processing to be performed when a plurality of sensors simultaneously obtain a plurality of types of data as input information.

FIG. 19 is a block diagram showing the functional arrangement of an information processing apparatus according to this embodiment. FIG. 19 differs from FIG. 1 showing the first embodiment in that a second sensor 108 is added. With regard to these sensors, a sensor 107 is a camera which captures luminance images like those described in the first embodiment, and the second sensor 108 is a distance measurement unit which captures distance images like those described in the second embodiment. Although the following will exemplify an arrangement including two types of sensors, the same applies to an arrangement including three or more sensors.

Assume that information to be identified includes two types of data, that is, a luminance image captured by imaging a given object using a general camera and a distance image obtained by measuring the same object using a distance measurement unit. That is, assume that a learning image file 130, image 136, and input image 137 in FIG. 19 are set so that luminance images and corresponding distance images are stored in pairs. For the sake of simplicity, assume that in this embodiment, luminance images are equal in image size to distance images.

The differences between the operation of weak classifier setting processing in this embodiment and that in the first embodiment will be described first with reference to FIG. 4. When generating a two-point reference location list in step S203, this embodiment determines a data type for each two-point reference location. A method of determining to which data type a specific two-point reference location should refer is not specifically limited. That is, it is possible to randomly determine data types or determine data types in accordance with the statuses of the respective data. FIG. 16 shows an example of a two-point reference location list 131 in this embodiment. Referring to FIG. 16, d(1) to d(Nb) represent data types. The embodiment uses two data types including a luminance image and a distance image, and hence can express a data type by one bit. For example, a luminance image is represented by 0, and a distance image is represented by 1. In addition, of the data structure of a classification tree 134 in the memory 106 in the embodiment, the portion of the two-point reference location list 503 in FIG. 7 is the same as the two-point reference location list 131 shown in FIG. 16. That is, data representing a data type is recorded at each two-point reference location of the two-point reference location list 503. Note that when loading an image for learning in step S206 in FIG. 4, the embodiment entirely loads a plurality of type data. That is, the embodiment loads both a luminance image and a distance image so as to allow access to them.

Figure 17:
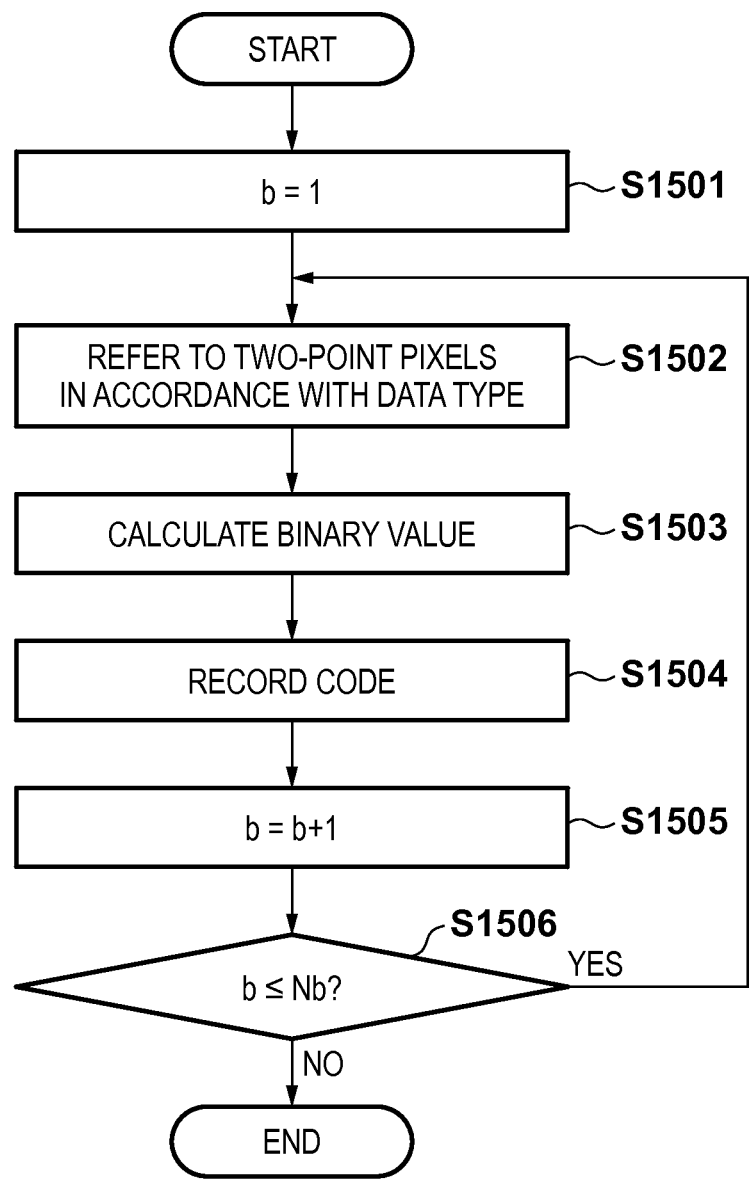
FIG. 17 is a flowchart showing the operation of encoding processing in the third embodiment.

Encoding processing in this embodiment will be described next with reference to FIG. 17. The respective steps in FIG. 17 are the same as steps S801 to S806 in FIG. 10 except for processing corresponding to step S1502, and hence a description of the steps other than step S1502 will be omitted. In step S1502, the apparatus refers to pixels in accordance with the data types (see FIG. 16) written in the two-point reference location list 131 stored in the memory 106. For example, the apparatus accesses a data value of a luminance image if the data type d(N) at the Nth two-point reference location is 0, and accesses a data value of a distance image if the data type d(N) is 1, in accordance with the two-point reference location.

The differences between identification processing in this embodiment and that in the first embodiment will be described next with reference to FIG. 7. In the second embodiment, in step S705 in FIG. 9, when reading out two-point reference locations from the dictionary, the apparatus also reads out the data types shown in FIG. 16 and stores them in the two-point reference location list 131 in a memory 106. In step S706, the apparatus executes encoding based on encoding processing in the embodiment. That is, the apparatus accesses data in accordance with the data types set at two-point reference locations and generates a code in accordance with the values of the data. This processing is the same as the encoding processing described in this embodiment.

Evaluation value calculation processing in this embodiment will be described next. The embodiment handles two data types, and hence includes two evaluation value calculation methods. The embodiment is characterized to switch evaluation value calculation criteria in accordance with the data type of reference destination. In the case described in the embodiment, the apparatus handles luminance value data and distance value data. The apparatus therefore uses evaluation values obtained with reference to the absolute value of a luminance value difference and the reliability value of a distance value described in the second embodiment. For the sake of simplicity, assume that both the absolute values of luminance value differences on a luminance image and the reliability values of distance values on a distance image have the same range (the same maximum and minimum values), and allow comparison between them.

Figure 18:
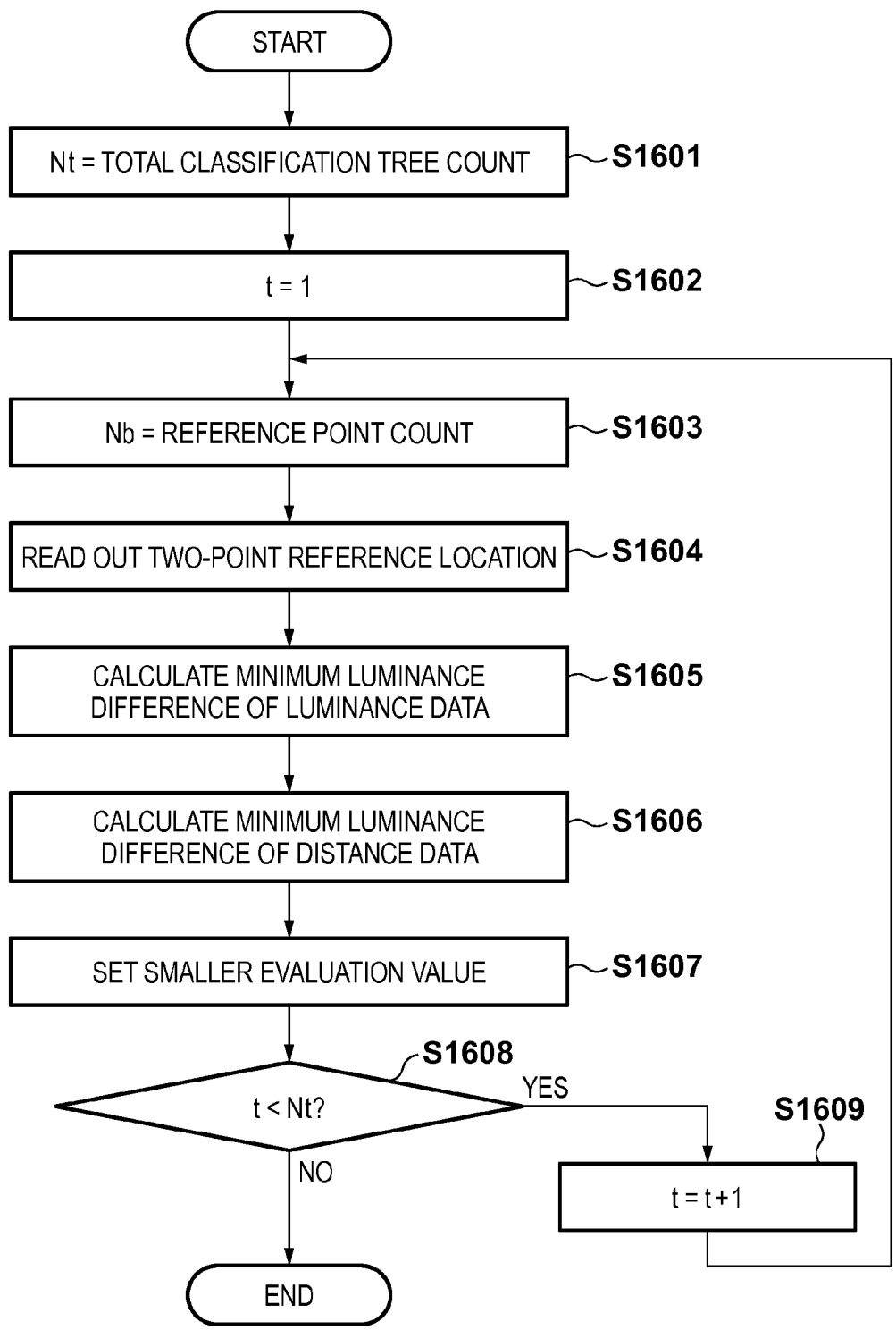
FIG. 18 is a flowchart showing the operation of evaluation value calculation processing in the third embodiment.

FIG. 18 is a flowchart for explaining the operation of evaluation value calculation processing in the third embodiment. This flowchart is similar to the flowchart of FIG. 11 for explaining the operation of the evaluation value calculation processing in the first embodiment. The processing in steps S1601 to S1603 is the same as that in steps S901 to S903 in FIG. 11, and hence a description of the processing will be omitted.

In step S1604, the apparatus reads out the two-point reference locations of the tth classification tree as in step S904 in FIG. 11. In this embodiment, the two-point reference location list in the dictionary also stores data indicating data types. FIG. 16 shows the data structure of the two-point reference location list 503. That is, in this case, the apparatus reads out data types together with two-point reference locations.

With regard to the input image 137, the apparatus calculates the absolute values of luminance value differences by accessing a luminance image concerning all the two-point reference locations, of the two-point reference locations read out in step S1604, for which data types representing a luminance image are set, and obtains the minimum value of them (step S1605). Subsequently, the apparatus obtains, for the input image 137, reliability values by accessing a reliability map (not shown) concerning all the two-point reference locations, of the two-point reference locations read out in step S1604, for which data types representing a distance image are set, and obtains the minimum value of them (step S1606).

The apparatus then sets, to the evaluation value 138 in the memory 106, a smaller one of the minimum luminance difference and the minimum reliability value calculated in steps S1605 and S1606, together with the classification tree t (step S1607). As described above, for the sake of simplicity, the apparatus directly compares a luminance value difference with a reliability value. However, the apparatus may compare them with each other upon assigning some weights to both of them. This embodiment does not limit the method of comparing the merits of both evaluation values. Subsequently, the apparatus determines whether the above processing has been performed for all the classification trees recorded in the dictionary 135 (step S1608). If the evaluation values of all the classification trees are calculated (NO in step S1608), the apparatus terminates the processing.

Processing other than that described here is the same as that in the first embodiment. The third embodiment has been described above. Note that when generating a two-point reference location list in step S203 in FIG. 4, the apparatus determines a data type for each two-point reference location. However, the apparatus may set the same data type for all the two-point reference locations set in one classification tree. Selectively using a data type for each classification tree can accurately classify even input data which are difficult to classify by using one of the data types, by using only the other data type. According to this embodiment, the apparatus may automatically use many classification trees configured to classify according to luminance images instead of distance images with respect to input data including many regions whose distance values have low reliabilities. If a luminance image has low contrast and includes a few regions exhibiting luminance differences, the apparatus may automatically select many classification trees based on a distance image instead of a luminance image.

This embodiment is characterized in that the apparatus does not determine a data type to be used by evaluating only input data for each data type but evaluates each classification tree by a combination of the type of input data and reference locations of the classification tree corresponding to the type. For example, even if distance data of poor quality as a whole is input as a distance image which has a few portions exhibiting high distance value reliabilities, it is possible to select a classification tree corresponding to a distance image as long as the classification tree exhibits high distance value reliabilities between two-point reference locations with respect to the distance image. In this regard, the processing in the embodiment differs from the processing of determining whether to use a distance image, by evaluating only the reliability of the overall distance image.

The present invention can provide a technique which can perform high-accuracy identification by properly selecting a reference location pattern of reference information which is to be used to classify input information.

<<Other Embodiments>>

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-264118 filed on Dec. 1, 2011, which is hereby incorporated by reference herein in its entirety.

What is claimed is:

1. An information processing apparatus comprising:
an acquisition unit configured to acquire a plurality of sets of a plurality of reference locations in reference information to be used for classifying input information and to prepare in a learning process the plurality of sets of the plurality of reference locations;
a second acquisition unit configured to acquire input information of an image;
an extraction unit configured to extract each piece of data from the input information in accordance with each of the sets of a plurality of reference locations;
an evaluation unit configured to evaluate each piece of data extracted by the extraction unit by comparing pixel values at the plurality of reference locations of the image;
a selection unit configured to select a set of a plurality of reference locations used for classification of the input information from the prepared plurality of sets of the a plurality of reference locations previously prepared in the learning process based on a result of evaluation by the evaluation unit according to the pixel values of the image at the plurality of reference locations; and
an execution unit configured to execute classification of the input information by using a feature amount in the selected set of a plurality of reference locations in the input information.

2. The apparatus according to claim 1, wherein the set of a plurality of reference locations includes not less than one reference location pair as a pair of two-point reference locations, and
said selection unit selects a set of a plurality of reference locations used for classification of the input information from the plurality of sets of a plurality of reference locations based on a magnitude of a difference between values of two-point data of input information in the reference location pair.

3. The apparatus according to claim 2, further comprising a calculation unit configured to calculate a minimum value of a magnitude of a difference between values of two-point data of input information in the reference location pair for each of said plurality of sets of a plurality of reference locations,
wherein said selection unit selects the set of plurality of reference locations exhibiting the minimum value larger than a predetermined value as a set of a plurality of reference locations used for classification of the input information.

4. The apparatus according to claim 2, further comprising a calculation unit configured to calculate a minimum value of a magnitude of a difference between values of two-point data of input information in the reference location pair for each of said plurality of sets of a plurality of reference locations,
wherein said selection unit selects a predetermined number of the sets of a plurality of reference locations in descending order of the minimum values as sets of a plurality of reference locations used for classification of the input information.

5. The apparatus according to claim 2, further comprising a calculation unit configured to calculate a sum total of magnitudes of differences between values of two-point data of input information in the reference location pairs for each of said plurality of sets of a plurality of reference locations,
wherein said selection unit selects the set of a plurality of reference locations exhibiting the sum total larger than a predetermined value as a set of a plurality of reference locations used for classification of the input information.

6. The apparatus according to claim 2, further comprising a calculation unit configured to calculate a sum total of magnitudes of differences between values of two-point data of input information in the reference location pairs for each of said plurality of sets of a plurality of reference locations,
wherein said selection unit selects a predetermined number of the sets of a plurality of reference locations in descending order of the sum totals as sets of a plurality of reference locations used for classification of the input information.

7. The apparatus according to claim 1, wherein the input information includes data indicating data of reliability corresponding to the data,
said extraction unit extracts data of the reliability in accordance with each of the plurality of sets of a plurality of reference locations,
said evaluation unit evaluates each piece of data extracted by the extraction unit based on a value of the extracted reliability; and
said selection unit selects the set of a plurality of reference locations used for classification of the input information based on a value of the extracted reliability.

8. The apparatus according to claim 7, further comprising a calculation unit configured to calculate a minimum value of values of the reliabilities for each of said plurality of sets of a plurality of reference locations, wherein said selection unit selects the set of a plurality of reference locations exhibiting the minimum value larger than a predetermined value as a set of a plurality of reference locations used for classification of the input information.

9. The apparatus according to claim 7, further comprising a calculation unit configured to calculate a minimum value of values of the reliabilities for each of said plurality of sets of a plurality of reference locations, wherein said selection unit selects a predetermined number of the sets of a plurality of reference locations in descending order of the minimum values as sets of a plurality of reference locations used for classification of the input information.

10. The apparatus according to claim 7, further comprising a calculation unit configured to calculate a sum total of values of the reliabilities for said each of said plurality of sets of a plurality, of reference locations, wherein said selection unit selects the set of a plurality of reference locations exhibiting the sum total larger than a predetermined value as a set of a plurality of reference locations used for classification of the input information.

11. The apparatus according to claim 7, further comprising a calculation unit configured to calculate a sum total of values of the reliabilities for each of said plurality of sets of a plurality of reference locations, wherein said selection unit selects a predetermined number of the sets of a plurality of reference locations in descending order of the sum totals as sets of a plurality of reference locations used for classification of the input information.

12. The apparatus according to claim 1, wherein the input information includes a plurality of pieces of information including data of different types, the set of a plurality of reference locations includes information specifying a type of the data to be referred to for each of said reference locations, and said extraction unit extracts data of a type to be referred to, which corresponds to the reference location, for each of the reference location, from the plurality of pieces of information of the input information.

13. The apparatus according to claim 12, wherein a type of a single piece of data to be referred to is specified for the one reference information pattern.

14. An information processing method in an information processing apparatus, the method comprising the following steps performed by a processor:

acquiring a plurality of sets of a plurality of reference locations in reference information to be used for classifying input information and to prepare in a learning process the plurality of sets of the plurality of reference locations;

acquiring input information of an image;

extracting each piece of data from the input information in accordance with each of the sets of a plurality of reference locations;

evaluating each piece of data extracted by the extraction unit by comparing pixel values at the plurality of reference locations of the image;

selecting a set of a plurality of reference locations used for classification of the input information from the prepared plurality of sets of the plurality of reference locations previously prepared in the learning process based on a result of evaluation by the evaluation unit according to the pixel values of the image at the plurality of reference locations; and executing classification of the input information by using a feature amount in the selected set of a plurality of reference locations in the input information.

15. A non-transitory computer-readable storage medium storing a computer program for causing a computer in an information processing apparatus to execute a code for acquiring a plurality of sets of a plurality of reference locations in reference information to be used for classifying input information and to prepare in a learning process the plurality of sets of a plurality of reference locations;

a code for acquiring input information of an image;

a code for extracting each piece of data from the input information in accordance with each of the sets of a plurality of reference locations;

a code for evaluating each piece of data extracted by the extraction unit by comparing pixel values at the plurality of reference locations of the image;

a code for selecting a set of a plurality of reference locations used for classification of the input information from the prepared plurality of sets of the plurality of reference locations previously prepared in the learning process based on a result of evaluation by the evaluation unit according to the pixel values of the image at the plurality of reference locations; and a code for executing classification of the input information by using a feature amount in the selected set of a plurality of reference locations in the input location.

16. The apparatus according to claim 1, wherein each of the reference information and the input information is an image, and the extraction unit extracts a pixel value of the image input as the information.

17. The apparatus according to claim 16, wherein the pixel value is a luminance value.

* * * * *